(12) United States Patent
Obata et al.

(10) Patent No.: US 8,558,970 B2
(45) Date of Patent: Oct. 15, 2013

(54) DISPLAY UNIT

(75) Inventors: Kei Obata, Miyagi (JP); Akihiro Horii, Miyagi (JP); Hiroshi Mizuno, Miyagi (JP); Noriyuki Hirai, Miyagi (JP); Mitsunari Hoshi, Miyagi (JP)

(73) Assignee: Sony Corporation, Tokyo (JP)

( * ) Notice: Subject to any disclaimer, the term of this patent is extended or adjusted under 35 U.S.C. 154(b) by 970 days.

(21) Appl. No.: 12/299,888

(22) PCT Filed: Mar. 17, 2008

(86) PCT No.: PCT/JP2008/054872
§ 371 (c)(1),
(2), (4) Date: Nov. 6, 2008

(87) PCT Pub. No.: WO2008/114774
PCT Pub. Date: Sep. 25, 2008

(65) Prior Publication Data
US 2009/0195728 A1    Aug. 6, 2009

(30) Foreign Application Priority Data

Mar. 20, 2007 (JP) ................................. 2007-073621
Jan. 28, 2008 (JP) ................................. 2008-016472

(51) Int. Cl.
*G02F 1/1335* (2006.01)
*F21V 7/04* (2006.01)
*G02B 5/30* (2006.01)
*G02B 27/28* (2006.01)

(52) U.S. Cl.
USPC ............. 349/64; 349/102; 349/115; 362/620; 359/485.02; 359/489.02

(58) Field of Classification Search
USPC .............. 349/102, 115; 362/620; 359/485.01, 359/485.02, 489.01, 489.02
See application file for complete search history.

(56) References Cited

U.S. PATENT DOCUMENTS 5,828,488 A * 10/1998 Ouderkirk et al. ....... 359/485.02
7,139,125 B1    11/2006 Mi (Continued)

FOREIGN PATENT DOCUMENTS

JP    10-293212    11/1998
JP    2000-122046    4/2000

(Continued)

OTHER PUBLICATIONS

European Search Report issued Mar. 11, 2011, corresponding to European Appln. No. 08722267.5.

(Continued)

*Primary Examiner* — Edward Glick
*Assistant Examiner* — Dennis Y Kim
(74) *Attorney, Agent, or Firm* — K&L Gates LLP

(57) ABSTRACT

A display unit in which the view angle in the horizontal direction of emitting light is wider than the view angle in the vertical direction thereof, in which the emitting light has a polarization component in the vertical direction viewable with the use of a polarized sunglass, and which is able to improve display luminance is provided. A luminance enhancement film has a plurality of convex sections which extend toward the horizontal direction and are arranged in the direction crossing the extending direction, and in which the refractive index in the extending direction is larger than the refractive index in the arrangement direction. A wave plate changes the polarization direction of light entering the wave plate so that an angle made by a polarization direction of the polarization component in the arrangement direction of the convex section after passing through the wave plate among light passing through the luminance enhancement film and the direction of a polarizing axis a of a first polarizer becomes small. A second polarizer has a polarizing axis b that transmits the polarization component in the vertical direction.

25 Claims, 25 Drawing Sheets

(56) References Cited

U.S. PATENT DOCUMENTS

| | | | |
|---|---|---|---|
| 2001/0035928 A1* | 11/2001 | Kuroiwa et al. | 349/115 |
| 2004/0169791 A1* | 9/2004 | Nilsen et al. | 349/96 |
| 2006/0082698 A1* | 4/2006 | Ko et al. | 349/61 |
| 2006/0274244 A1 | 12/2006 | Battiato et al. | |
| 2007/0008471 A1* | 1/2007 | Wang et al. | 349/117 |
| 2007/0133226 A1* | 6/2007 | Mi | 362/607 |

FOREIGN PATENT DOCUMENTS

| | | |
|---|---|---|
| JP | 2000-221324 | 8/2000 |
| JP | 2005-091825 | 4/2005 |
| JP | 2005091825 | 4/2005 |
| JP | 2006-039545 | 2/2006 |
| JP | 2006-078917 | 3/2006 |
| JP | 2006-299114 | 11/2006 |

OTHER PUBLICATIONS

European Office Action issued Oct. 12, 2011, for corresponding European Appln. No. 08722267.5.

Japanese Patent Office, Notification of reasons for refusal issued in connection with Japanese Patent Application No. 2008-016472, dated Sep. 11, 2012. (3 pages).

* cited by examiner

DRAWING DIRECTION

|  | FRONT LUMINANCE (cd/m$^2$) | ILLUMINANCE (lm/m$^2$) | HORIZOTAL VIEW ANGLE (HALF BANDWIDTH, deg) | VERTICAL VIEW ANGLE (deg) |
|---|---|---|---|---|
| EXAMPLE 1 | 1975 | 3423 | 114 | 76 |
| COMPARATIVE EXAMPLE 1 | 1715 | 2582 | 98 | 73 |
| COMPARATIVE EXAMPLE 2 | 1526 | 2046 | 89 | 45 |
| COMPARATIVE EXAMPLE 3 | 2002 | 3427 | 74 | 105 |

FIG. 18

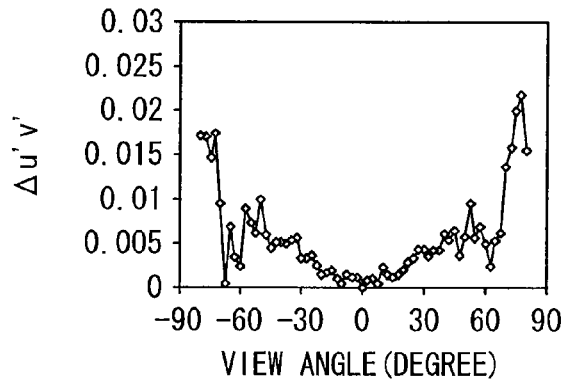
FIG. 20(A) COMPARATIVE EXAMPLE 4 (HORIZONTAL DIRECTION)
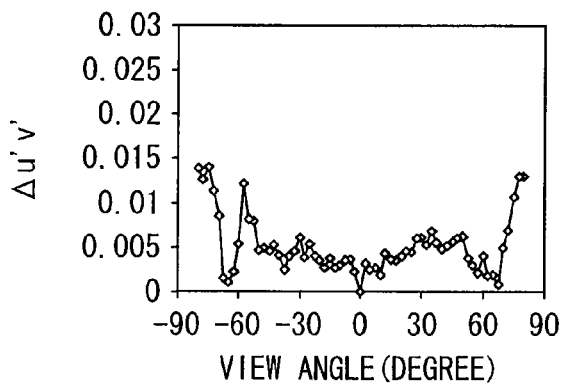
FIG. 20(B) COMPARATIVE EXAMPLE 4 (VERTICAL DIRECTION)
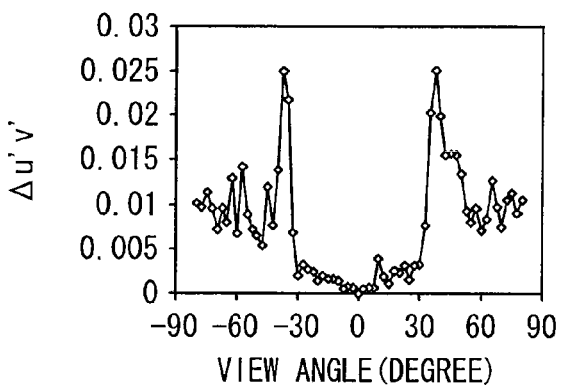
FIG. 20(C) EXAMPLE 1 (HORIZONTAL DIRECTION)
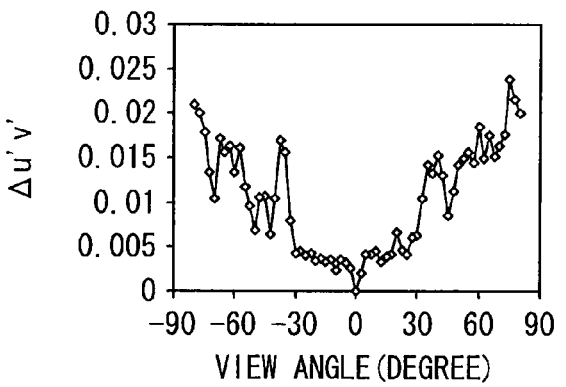
FIG. 20(D) EXAMPLE 1 (VERTICAL DIRECTION)

| | ORIENTATION OF POLARIZATION PLATE ON EMITTING SIDE | FRONT LUMINANCE (nit) | ILLUMINANCE (lm/m$^2$) |
|---|---|---|---|
| EXAMPLE 2 | HORIZONTAL POLARIZATION | 633 | 846 |
| EXAMPLE 3 | VERTICAL POLARIZATION | 734 | 1418 |
| COMPARATIVE EXAMPLE 5 | HORIZONTAL POLARIZATION | 4 | 48 |
| COMPARATIVE EXAMPLE 6 | VERTICAL POLARIZATION | 1383 | 2147 |

FIG. 22

DISPLAY UNIT

CROSS REFERENCE TO RELATED APPLICATIONS

The present application claims priority to Japanese Patent Application No. 2007-073621 filed on Mar. 20, 2007, and JP 2008-016472 filed on Jan. 28, 2008, the entire contents of which are being incorporated herein by reference.

BACKGROUND

[The present disclosure relates to a display unit including a light transmissive film referred to as a luminance enhancement film.

In these years, Cathode Ray Tubes (CRT) that were a mainstream of display units in the past have been replaced with liquid crystal displays, due to advantages such as the low electrical power consumption and the space-saving, and the low cost and the like.

There are several types of the liquid crystal displays when categorized by, for example, illumination methods in displaying images. As a representative example, a transmissive display unit that displays images by utilizing a light source arranged behind a liquid crystal display panel is cited.

By the way, in such a display unit, it is extremely important to decrease the electrical power consumption and increase the display luminance in order to increase the commercial value of the display unit. Thus, it has been strongly aspired that the gain of the optical system provided between the liquid crystal display panel and the light source is increased, while the electrical power consumption of the light source is kept low as much as possible.

For example, in Japanese Patent No. 3158555, a measure of providing a light transmissive film referred to as the luminance enhancement film between a liquid crystal display panel and a light source is disclosed. A description will be hereinafter specifically given of the light transmissive film by using FIG. 24.

FIG. 24 shows a schematic structure of a transmissive display unit 100 including the foregoing light transmissive film. The display unit 100 includes a liquid crystal display panel 110, a first polarizer 120A and a second polarizer 120B that sandwich the liquid crystal display panel 110, an lighting device 130 arranged behind the first polarizer 120A, and a drive circuit (not shown) displaying an image by driving the liquid crystal display panel 110. The front face of the second polarizer 120B is oriented to the observer side (not shown).

The first polarizer 120A and the second polarizer 120B are respectively arranged so that their polarizing axes a and b are directed differently from each other by 90 degrees. Thereby, emitting light L from the lighting device 130 is transmitted through the liquid crystal display panel 110 or blocked. Further, in general, the second polarizer 120B arranged on the light emitting side is arranged so that the polarizing axis b is in the vertical direction in order to allow light passing through the second polarizer 120B to be viewed with the use of a polarized sunglass. Therefore, the polarizing axis a of the first polarizer 120A arranged on the light incidence side is in the horizontal direction.

The lighting device 130 has, for example, a plurality of linear light sources 131 extending in the horizontal direction. On the liquid crystal display panel 110 side of the linear light sources 131, a diffusion sheet 132 and a light transmissive film 133 are arranged sequentially from the linear light source 131 side. Meanwhile, a reflective sheet 134 is arranged behind the linear light source 131.

The light transmissive film 133 has a plurality of prisms 133A in the shape of a triangle pole on the face (front face) on the light emitting side. The respective prisms 133A extend in the horizontal direction and are arranged in parallel in the vertical direction. Thereby, out of light emitted from the linear light sources 131, the light mainly divergent in the vertical direction is raised in the direction orthogonal to the liquid crystal display panel 110 (front face direction) to be collect.

In the display unit 100, the emitting light L from the linear light sources 131 directly enters the diffusion sheet 132, or is reflected by the reflective sheet 134 and then enters the diffusion sheet 132. The emitting light L is evenly diffused by the diffusion sheet 132, is collected in the light transmissive film 133, and is emitted toward the first polarizer 120A. Of the light entering the first polarizer 120A, a polarization component in parallel with the polarizing axis a passes through the first polarizer 120A. The light passing through the first polarizer 120A passes through the second polarizer 120B to the observer side according to a voltage size applied to each pixel by the not-shown drive circuit.

As described above, by arranging the light transmissive film 133 between the first polarizer 120A and the diffusion sheet 132, the emitting light L from the lighting device 130 can be effectively caused to be incident on the liquid crystal display panel 110. As a result, the display luminance is able to be improved.

However, in the display unit 100 shown in FIG. 24, the light passing through the light transmissive film 133 is non-polarized light, and thus about half of the transmitted light (polarization component in the direction crossing the polarizing axis a) is absorbed into the first polarizer 120A. Therefore, only by providing the light transmissive film 133 between the liquid crystal display panel 110 and the light source, use efficiency of the illuminating light from the linear light sources 131 is not improved much, and thus the display luminance is not able to be improved sufficiently.

Thus, it is conceivable that a reflective polarizer that transmits a polarization component in parallel with the polarizing axis a (polarization component in the horizontal direction) and reflects a polarization component in the direction crossing the polarizing axis is arranged between the light transmissive film 133 and the first polarizer 120A. However, the reflective polarizer has a sandwich structure in which, for example, a multilayer film alternately stacking thin films having a refractive index different from each other is sandwiched between a pair of diffusion films. In general, such as reflective polarizer is expensive. Therefore, in the case where the reflective polarizer is used, the cost of the display unit 100 is high. Further, the polarization component in the direction crossing the polarizing axis a is somewhat leaked from the reflective polarizer and is absorbed into the first polarizer 120A. Therefore, there is room for improvement with regard to the cost, the light use efficiency, and the display luminance.

Then, to improve the light use efficiency and the display luminance at low cost, for example, it is conceivable that the light transmissive film 133 is provided with refractive index anisotropy. Specifically, instead of the light transmissive film 133, a light transmissive film 233 that is made of a semicrystalline or crystalline resin in which the refractive index in the drawing direction is larger than the refractive index in the direction orthogonal to the drawing direction, and that is provided with refractive index anisotropy by being stretched in the extending direction of the prism 133A is arranged, as shown in FIG. 25. However, the polarizing axis of the light transmissive film 233 is in the vertical direction, and thus the polarizing axis is orthogonal to the polarizing axis a of the first polarizer 120A. Accordingly, the display luminance is significantly lowered.

Therefore, it is conceivable that the first polarizer 120A and the second polarizer 120B are rearranged so that the polarizing axis a is in parallel with the polarizing axis of the light transmissive film 233, as shown in FIG. 26, or the light transmissive film 233 is rearranged so that the polarizing axis of the light transmissive film 233 is in parallel with the polarizing axis a, as shown in FIG. 27. However, in the former case, the orientation of the polarizing axis b of the second polarizer 120B becomes in the horizontal direction, and thus the polarization component of light passing through the second polarizer 120B also becomes in the horizontal direction. Accordingly, it is difficult to view the light passing through the second polarizer 120B with the use of a general polarized sunglass. In the latter case, since the light transmissive film 233 functions to collect, out of illuminating light from the linear light sources 131, the light by raising the light mainly divergent in the horizontal direction in the direction orthogonal to the liquid crystal display panel 110 (front face direction), the view angle in the horizontal direction is narrower than the view angle in the vertical direction.

SUMMARY

In view of the foregoing, it is an object of the present application to provide a display unit in which the view angle in the horizontal direction of emitting light is wider than the view angle in the vertical direction, in which the emitting light has a polarization component in the vertical direction viewable with the use of a polarized sunglass, and which allows the improvement of the display luminance.

A first display unit of an embodiment includes a display panel driven based on an image signal, a pair of a first polarizer and a second polarizer sandwiching the display panel, a light source illuminating the display panel, a light transmissive film provided between the first polarizer and the light source, and a wave plate provided between the first polarizer and the light transmissive film. The light transmissive film has a plurality of first convex sections in one plane. The respective first convex sections extend toward the horizontal direction, and are arranged in a direction crossing an extending direction thereof. Further, a refractive index in one direction of the respective first convex sections is larger than a refractive index in a direction orthogonal to the one direction. Further, the wave plate changes a polarization direction of light entering the wave plate so that an angle made by a polarization direction of a polarization component in the direction orthogonal to the one direction after passing through the wave plate among light passing through the light transmissive film and a polarizing axis direction of the first polarizer becomes small. Further, the second polarizer has a polarizing axis transmitting a polarization component in the vertical direction.

In the first display unit of an embodiment, the respective first convex sections of the light transmissive film extend toward the horizontal direction, and are arranged in the direction crossing the extending direction thereof. Thus, the light mainly divergent in the arrangement direction out of the illuminating light from the light source is raised in the direction orthogonal to the display panel (front face direction) to be collected. Further, the refractive index in the one direction of the respective first convex sections is larger than the refractive index in the direction orthogonal to the one direction. Thus, the reflection amount of the polarization component in the one direction becomes larger than the reflection amount in the direction orthogonal to the one direction. Therefore, in the light passing through the light transmissive film, the light amount of the polarization component in the direction orthogonal to the one direction becomes larger than the light amount of the polarization component in the one direction. Further, the wave plate changes the polarization direction of the light entering the wave plate so that the angle made by the polarization direction of the polarization component in the direction orthogonal to the one direction (polarization component in the axis direction) after passing through the wave plate out of the light passing through the light transmissive film and the polarizing axis direction of the first polarizer becomes small. Thereby, the polarization component in the axis direction of the light passing through the light transmissive film is able to pass through the first polarizer while keeping its absorption into the first polarizer low. Further, the second polarizer has the polarizing axis transmitting the polarization component in the vertical direction. Thus, all or part of the polarization component in the vertical direction out of the light entering the second polarizer passes through the second polarizer.

A second display unit of an embodiment includes a display panel driven based on an image signal, a pair of a first polarizer and a second polarizer sandwiching the display panel, a light source illuminating the display panel, a light transmissive film provided between the first polarizer and the light source, and a wave plate provided on the other side of the display panel of the second polarizer. The light transmissive film has a plurality of convex sections in one plane. The respective convex sections extend toward the horizontal direction, and are arranged in a direction crossing an extending direction thereof. Further, a refractive index in one direction of the respective convex sections is larger than a refractive index in a direction orthogonal to the one direction. The first polarizer has a polarizing axis transmitting a polarization component in the direction orthogonal to the one direction. The second polarizer has a polarizing axis transmitting light passing through the display panel. Further, the wave plate changes a polarization state of the light passing through the second polarizer to a state other than horizontal polarized light.

In the second display unit of an embodiment, the respective convex sections of the light transmissive film extend toward the horizontal direction, and are arranged in the direction crossing the extending direction thereof. Thus, the light mainly divergent in the arrangement direction out of illuminating light from the light source is raised in the direction orthogonal to the display panel (front face direction) to be collected. Further, the refractive index in the one direction of the respective convex sections is larger than the refractive index in the direction orthogonal to the one direction. Thus, the reflection amount of the polarization component in the one direction becomes larger than the reflection amount in the direction orthogonal to the one direction. Therefore, in the light passing through the light transmissive film, the light amount of the polarization component in the direction orthogonal to the one direction becomes larger than the light amount of the polarization component in the one direction. Further, the first polarizer has the polarizing axis transmitting the polarization component in the direction orthogonal to the one direction (polarization component in the axis direction) out of the light passing through the light transmissive film. Thus, the polarization component in the axis direction of the light passing through the light transmissive film is able to pass through the first polarizer while keeping its absorption into the first polarizer low. Further, the second polarizer has the polarizing axis transmitting the light passing through the display panel. Thus, the polarization component in the axis direction of the light passing through the light transmissive film is able to pass through the second polarizer while keeping its absorption into the second polarizer low. Further, the wave plate changes the polarization state of the light passing through the second polarizer to the state other than horizontal polarized light. Thus, the polarization state of the polarization component in the axis direction of the light passing through the light transmissive film is changed to the state other than horizontal polarized light by the wave plate.

According to the first display unit of an embodiment, the light mainly divergent in the arrangement direction out of the illuminating light from the light source is raised in the front face direction to be collected. Thus, the view angle in the horizontal direction of light passing through the second polarizer is wider than the view angle in the vertical direction. Further, the polarization component in the axis direction of the light passing through the light transmissive film is able to pass through the first polarizer while keeping its absorption into the first polarizer low. Thus, the display luminance is able to be improved. Further, all or part of the polarization component in the vertical direction out of the light entering the second polarizer passes through the second polarizer. Therefore, the light passing through the second polarizer is able to be viewed with the use of a polarized sunglass.

According to the embodiment of the second display unit, the light mainly divergent in the arrangement direction out of the illuminating light from the light source raised in the front face direction to be collected. Thus, the view angle in the horizontal direction of light passing through the second polarizer is wider than the view angle in the vertical direction. Further, the polarization component in the axis direction of the light passing through the light transmissive film is able to pass through the first polarizer and the second polarizer while keeping its absorption into the first polarizer and the second polarizer low. Thus, the display luminance is able to be improved. Further, the polarization state of the polarization component in the axis direction of the light passing through the light transmissive film is changed to the state other than horizontal polarized light by the wave plate. Thus, the light passing through the wave plate is able to be viewed with the use of a polarized sunglass.

Therefore, in the embodiments of the first and the second display units, the view angle in the horizontal direction of emitting light is wider than the view angle in the vertical direction thereof, the emitting light has the polarization component in the vertical direction viewable with the use of a polarized sunglass, and the display luminance is able to be further improved.

Additional features and advantages are described herein, and will be apparent from, the following Detailed Description and the figures.

BRIEF DESCRIPTION OF THE FIGURES

FIG. 18 A contrast diagram for explaining a front luminance and the like of the display units according to Example 1 and Comparative examples 1 to 3.

FIG. 20 Relational diagrams showing a relation between a view angle and a color difference of the display units according to Example 1 and Comparative example 4.

FIG. 22 A contrast diagram for explaining a front luminance and the like of the display units according to Examples 2 and 3 and Comparative examples 5 and 6.

DETAILED DESCRIPTION

Embodiments will be hereinafter described in detail with reference to the drawings.

First Embodiment

Figure 1:
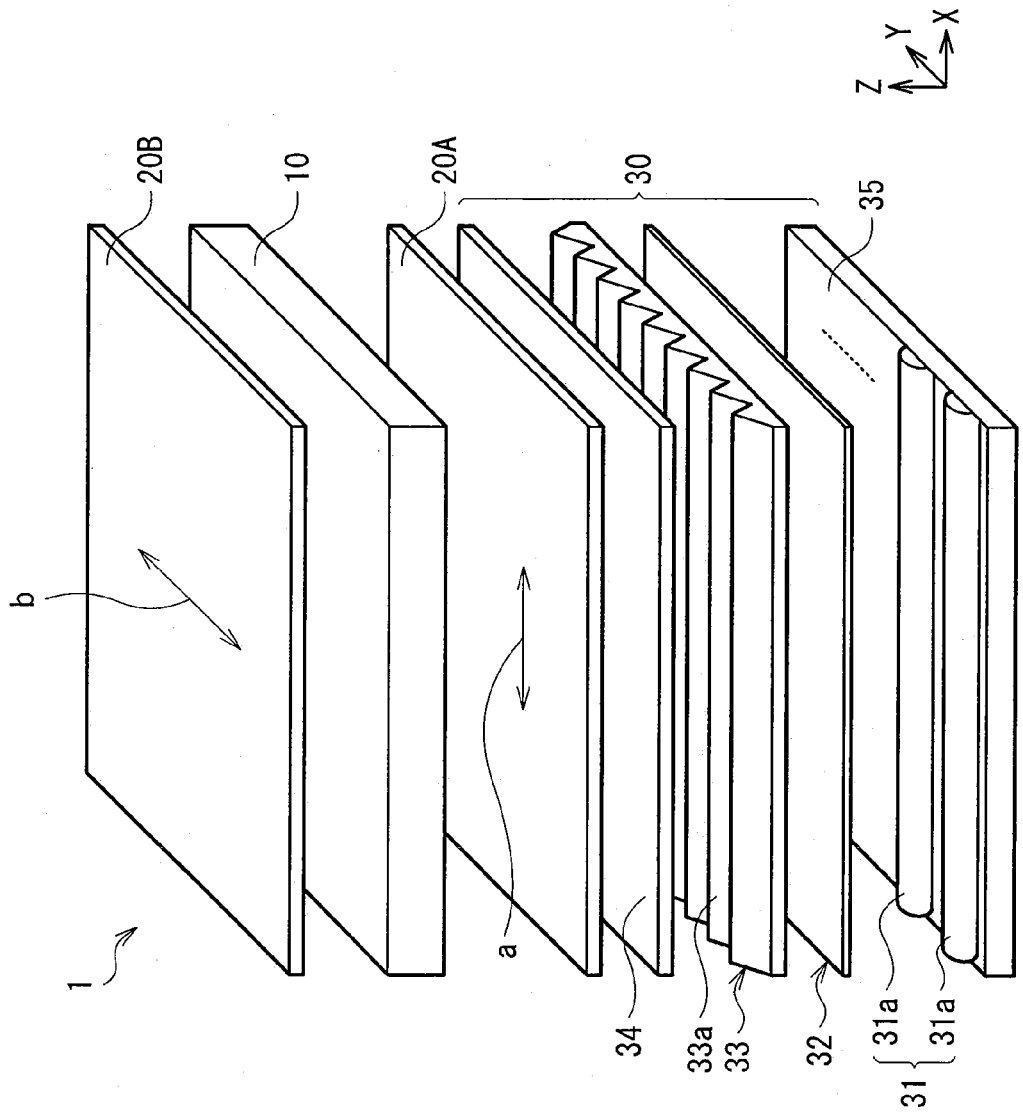
FIG. 1 A perspective view showing an example of a developed configuration of a display unit according to a first embodiment.

FIG. 1 shows a schematic configuration of a display unit 1 according to a first embodiment. The display unit 1 includes a liquid crystal display panel 10, a first polarizer 20A and a second polarizer 20B that sandwich the liquid crystal display panel 10, an lighting device 30 arranged behind the first polarizer 20A, and a drive circuit (not shown) for displaying an image by driving the liquid crystal display panel 10. The front face of the second polarizer 20B is oriented to the observer side (not shown).

The lighting device 30 has a light source 31. For example, on the liquid crystal display panel 10 side of the light source 31, a diffusion sheet 32, a luminance enhancement film 33 (light transmissive film), and a wave plate 34 are arranged sequentially from the light source 31 side. Meanwhile, a reflective sheet 35 is arranged behind the light source 31. As described above, the lighting device 30 in this embodiment is so-called direct illumination type, but may be, for example, side edge type using a light guide plate.

In the light source 31, for example, a plurality of linear light sources 31a are arranged in parallel at equal spaces (for example, 20 mm). As the linear light source 31a, for example, a Hot Cathode Fluorescent Lamp (HCFL), a Cold Cathode Fluorescent Lamp (CCFL) or the like is cited. The light source 31 may be, for example, a light source in which point light sources such as a Light Emitting Diode (LED) are two-dimensionally arranged, or a surface light source such as an organic Electro Luminescence (EL).

The diffusion sheet 32 is, for example, a diffusion plate formed by distributing a diffusion material (filler) in a relatively thick plate-like transparent resin; a diffusion film formed by coating a relatively thin film-like transparent resin with a transparent resin (binder) containing a diffusion material; or a combination thereof. For the plate-like or film-like transparent resin, for example, PET (polyethylene terephthalate), acryl, polycarbonate or the like is used. For the diffusion material, for example, an inorganic filler such as $SiO_2$, an organic filler such as acryl or the like is used.

The reflective sheet 35 is, for example, a foamed PET and reflects part of emitting light from the light source 31 in the direction of the liquid crystal display panel 10. Thereby, the emitting light from the light source 31 is able to be effectively utilized.

Figure 2:
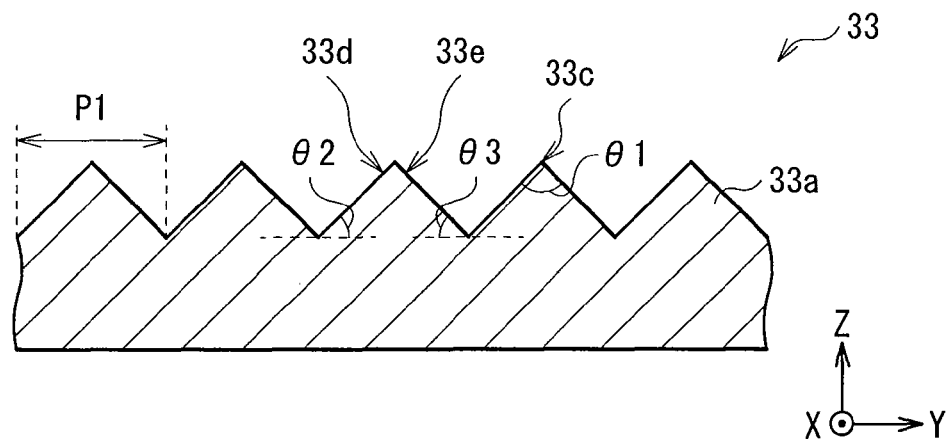
FIG. 2 A cross section view showing an example of a structure of a luminance enhancement film of FIG. 1.

The luminance enhancement film 33 is made of, for example, a resin material having translucency. A face including the luminance enhancement film 33 is arranged in parallel with the front face of the liquid crystal display panel 10. On the face (front face) on the light emitting side of the luminance enhancement film 33, a plurality of columnar convex sections 33a (first convex section) extend toward the horizontal direction and are sequentially arranged in parallel in the direction crossing the extending direction. In this case, "toward the horizontal direction" is a concept including not only the horizontal direction but also directions crossing the horizontal plane at an angle in the range from more than 0 degree to less than 45 degrees. As shown in FIG. 2, it is preferable that each convex section 33a extends in the horizontal direction and is sequentially arranged in parallel in the direction orthogonal to the extending direction (vertical direction). FIG. 2 is a cross section view showing an example of an enlarged cross section of the luminance enhancement film 33. Meanwhile, the face (rear face) on the light incidence side of the luminance enhancement film 33 is, for example, a plane face.

For example, as shown in FIG. 2, each convex section 33a is in the shape of a triangle pole having inclined faces 33d and 33e contacting with a top portion 33c having apex angle θ1. The inclined faces 33d and 33e are arranged diagonally opposed to the face including the luminance enhancement film 33 at base angles of θ2 and θ3. A width in the arrangement direction of each convex section 33a (pitch P1) is, for example, in the range from 10 μm to 350 μm. In addition, each convex section 33a is not limited to the shape of the triangle pole shown in FIG. 2. For example, each convex section 33a may be in the shape of a polygonal pole (prism shape) such as a pentagonal pole. Otherwise, each convex section 33a may have a curved face shape (for example, cylindrical shape) such as an oval shape and an aspheric shape in the direction orthogonal to the extending direction of each convex section 33a.

Further, each convex section 33a does not necessarily have the same shape and the same size as those of other convex sections 33a. For example, (A) a space structure composed of a pair of two adjacent convex sections 33a having an identical shape in which one thereof is high (large) and the other thereof is low (small) may be arranged at intervals of an equal pitch in the arrangement direction; for example, (B) a space structure composed of a pair of two adjacent convex sections 33a having an identical height and a different shape may be arranged at intervals of an equal pitch in the arrangement direction; and for example, (C) a space structure composed of a pair of two adjacent convex sections 33a having a different shape and a different size (height) may be arranged at intervals of an equal pitch in the arrangement direction. In addition, it is also possible to provide a plurality of convex sections and concave sections in the extending direction of each convex section 33a.

Thereby, each convex section 33a refracts and transmits the component in the arrangement direction of each convex section 33a out of the light entering from the rear face side of the luminance enhancement film 33 toward the direction orthogonal to the liquid crystal display panel 10 to improve the directivity. In each convex section 33a, light collection effect due to refraction action of each convex section 33a is little for the component in the extending direction of each convex section 33a out of the light entering from the rear face side of the luminance enhancement film 33.

By the way, in this embodiment, each convex section 33a has refractive index anisotropy in which refractive index in one direction is larger than refractive index in the direction orthogonal to the one direction. Specifically, the refractive index in the extending direction of each convex section 33a is larger than the refractive index in the arrangement direction of each convex section 33a. Therefore, in the case where the plurality of columnar convex sections 33a extend in the horizontal direction and are sequentially arranged in parallel in the direction orthogonal to the extending direction (vertical direction) as shown in FIG. 2, the refractive index in the horizontal direction is larger than the refractive index in the vertical direction.

The in-plane anisotropy of the refractive index is able to be generated by stretching a sheet containing a semicrystalline or crystalline resin in one direction. The semicrystalline or crystalline resin includes a resin in which the refractive index in the drawing direction is larger than the refractive index in the direction orthogonal to the drawing direction, a resin in which the refractive index in the drawing direction is smaller than the refractive index in the direction orthogonal to the drawing direction, and the like. As a material showing the positive birefringence in which the refractive index in the drawing direction becomes large, for example, PET (polyethylene terephthalate), PEN (polyethylene naphthalate), a copolymer such as a mixture thereof and PET-PEN copolymer, polycarbonate, polyvinyl alcohol, polyester, polyvinylidene fluoride, polypropylene, polyamide or the like is cited. Meanwhile, as a material showing the negative birefringence in which the refractive index in the drawing direction becomes small, for example, a methacryl resin, a polystyrene resin, a styrene-methylmethacrylate copolymer, a mixture thereof or the like is cited.

The in-plane anisotropy of the refractive index is able to be also generated by, for example, using a crystalline material having refractive index anisotropy. Further, in terms of simplification of the manufacturing process, the entire luminance enhancement film 33 is preferably made of an identical material. However, for example, each convex section 33a may be made of a material different from that of other regions.

Next, a description will be given of a function of the luminance enhancement film 33 in the case where the refractive index of the entire luminance enhancement film 33 differs between in the extending direction of each convex section 33a and in the arrangement direction of each convex section 33a.

Figure 3:
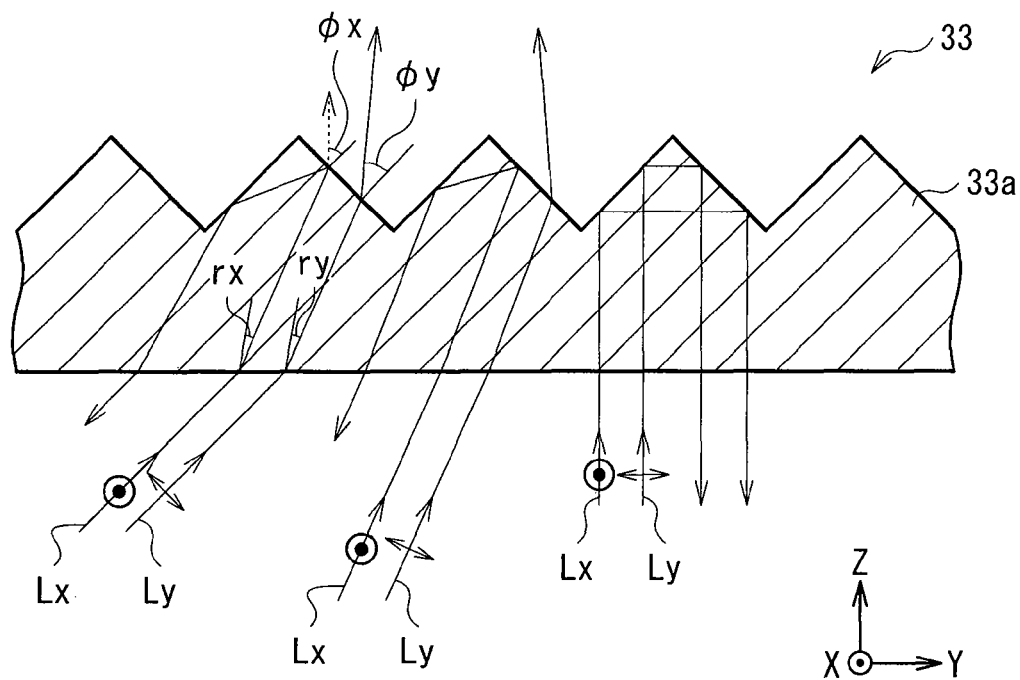
FIG. 3 A characteristics diagram showing transmission characteristics of the luminance enhancement film of FIG. 1.

FIG. 3 shows an example of a light path in the case where light of the lighting device 30 enters from the rear face of the luminance enhancement film 33, when the entire luminance enhancement film 33 is made of a material in which refractive index nx in the extending direction of each convex section 33a is larger than refractive index ny in the arrangement direction of each convex section 33a (nx>ny). In FIG. 3, Lx represents a polarization component oscillating in the extending direction (X direction) of each convex section 33a out of the light of the lighting device 30. Ly represents a polarization component oscillating in the arrangement direction (Y direction) of each convex section 33a out of the light of the lighting device 30.

In the light of the lighting device 30 entering from the diagonal direction with respect to the face including the luminance enhancement film 33, the refractive index of each convex section 33a in the extending direction of each convex section 33a is different from the refractive index in the arrangement direction of each convex section 33a (nx>ny in FIG. 3). Thus, the X-direction polarization component Lx and the Y-direction polarization component Ly of the light of the lighting device 30 are respectively refracted on the rear face of the luminance enhancement film 33 at refractive angles rx and ry different from each other (rx<ry in FIG. 3), and emits from the front face of the luminance enhancement film 33 (light emitting face of each convex section 33a) at emitting angles φx, φy (φx>φy in FIG. 3) different from each other.

At this time, in the luminance enhancement film 33, the refractive index in the extending direction of each convex section 33a is different from the refractive index in the arrangement direction of each convex section 33a (nx>ny in FIG. 3). Thus, the respective polarization components oscillating in the respective directions are reflected by an interface such as the rear face of the luminance enhancement film 33 and the light emitting face of the convex section 33a at reflectance different from each other. Therefore, as exemplified in FIG. 3, in the case where in the entire luminance enhancement film 33, the refractive index nx in the extending direction of each convex section 33a is larger than the refractive index ny in the arrangement direction of each convex section 33a, the reflection amount of Lx becomes larger than the reflection amount of Ly. Thus, in the light passing through the luminance enhancement film 33, the light amount of Ly becomes larger than the light amount of Lx.

In addition, in the luminance enhancement film 33, the refractive index in the extending direction of each convex section 33a is different from the refractive index in the arrangement direction of each convex section 33a (nx>ny in FIG. 3). Thus, the respective polarization components oscillating in the respective directions have a critical angle different from each other on an interface such as the rear face of the luminance enhancement film 33 and the light incidence face of the convex section 33a. Therefore, as exemplified in the central part of FIG. 3, for light entering at a certain incident angle, in the case where the angle at which the light enters the emitting face is larger than the critical angle of Lx and smaller than the critical angle of Ly on the light emitting face, Lx is totally reflected and Ly is transmitted. Therefore, the polarization component Lx is repeatedly reflected totally by the light emitting face of each convex section 33a to become returned light, and only the polarization component Ly is able to realize a total polarization split state to pass through the light emitting face of each convex section 33a.

Further, if the incident angle of light of the lighting device 30 to the light emitting face of each convex section 33a is excessively large, as shown in the right side of FIG. 3, the light of the lighting device 30 is repeatedly reflected totally by the light emitting face of each convex section 33a to become returned light back to the lighting device 30 side regardless of the polarization state.

As described above, in the case where the luminance enhancement film 33 has the in-plane refractive index anisotropy, the luminance enhancement film 33 is able to obtain a certain polarization split action in addition to light collection action of the light of the lighting device 30. Thereby, light use efficiency is higher and the front luminance is further improved than in a case where the luminance enhancement film 33 does not have polarization split action.

Next, a description will be given of the wave plate 34. The wave plate 34 changes the polarization state of the light passing through the luminance enhancement film 33. The wave plate 34 changes the polarization direction of the light entering the wave plate 34 so that an angle made by a polarization direction of the polarization component in the polarizing axis direction (direction in which the polarization component is largest) after passing through the wave plate 34 among the light passing through the luminance enhancement film 33 and the polarizing axis a of the first polarizer 20A becomes small, preferably 0 degree. Therefore, in the case where the plurality of columnar convex sections 33a extend in the horizontal direction and are sequentially arranged in parallel in the direction orthogonal to the extending direction (vertical direction), as shown in FIG. 2, the wave plate 34 changes the polarization direction of the light entering the wave plate 34 so that an angle made by a polarization direction of the polarization component in the arrangement direction of each convex section 33a after passing through the wave plate 34 out of the light passing through the luminance enhancement film 33 and the polarizing axis a of the first polarizer 20A becomes small, preferably 0 degree.

For example, in the case where an angle made by a polarizing axis direction of the light passing through the luminance enhancement film 33 and the polarizing axis a direction of the first polarizer 20A is 90 degrees, the wave plate 34 is preferably ½ wavelength plate. The ½ wavelength plate has refractive index anisotropy and allow the polarizing axis of the light entering the ½ wavelength plate to rotate by 90 degrees by setting an angle made by the axis direction of refractive index anisotropy of the ½ wavelength plate (slow phase axis direction) and the arrangement direction of the convex section 33a in the luminance enhancement film 33 to 45 degrees.

The liquid crystal display panel 10 is, for example, a transmissive display panel in which each pixel is driven in response to a video signal. The liquid crystal display panel 10 has a structure in which a liquid crystal layer is sandwiched between a pair of transparent substrates. Specifically, the liquid crystal display panel 10 has a transparent substrate, a color filter, a transparent electrode, an alignment film, a liquid crystal layer, an alignment film, a transparent pixel electrode, and a transparent substrate sequentially from the observer side.

In this case, the transparent substrate is generally a substrate transparent to visible light. In addition, in the transparent substrate on the lighting device 30 side, an active drive circuit including a Thin Film Transistor (TFT) as a drive device electrically connected to the transparent pixel electrode, wiring and the like is formed. In the color filter, color filters for respectively separating emitting light from the lighting device 30 into three primary colors of red (R), green (G), and blue (B) are arranged. The transparent electrode is made of, for example, Indium Tin Oxide (ITO), and functions as a common opposed electrode. The alignment film is made of, for example, a polymer material such as polyimide, and performs alignment treatment for the liquid crystal. The liquid crystal layer is made of, for example, Vertical Alignment (VA) mode liquid crystal, Twisted Nematic (TN) mode liquid crystal, or Super Twisted Nematic (STN) mode liquid crystal. The liquid crystal layer has a function to transmit or block emitting light from the lighting device 30 for every pixel by a voltage applied from a not-shown drive circuit. The transparent pixel electrode is made of, for example, ITO, and functions as an electrode for every pixel.

The first polarizer 20A is a polarizer arranged on the light incidence side of the liquid crystal display panel 10. The second polarizer 20B is a polarizer arranged on the light emitting side of the liquid crystal display panel 10. The first polarizer 20A and the second polarizer 20B are a kind of optical shutter, and transmit only light in a certain oscillation direction (polarized light). The first polarizer 20A and the second polarizer 20B are respectively arranged for example so that their polarizing axes are directed differently from each other by a given degree (for example, 90 degrees). Thereby, emitting light from the lighting device 30 is transmitted through the liquid crystal layer or blocked.

The orientation of the polarizing axis a of the first polarizer 20A is set to in a range in which the light passing through the wave plate 34 is able to be transmitted. For example, the polarizing axis a is set to the direction obtained by displacing the polarizing axis direction of the light passing through the luminance enhancement film 33 by a rotation angle of the polarizing axis through the wave plate 34. Therefore, in the case where the plurality of columnar convex sections 33a extend in the horizontal direction and are sequentially arranged in parallel in the direction orthogonal to the extending direction (vertical direction) as shown in FIG. 2, and the rotation angle of the polarizing axis by the wave plate 34 is 90 degrees, the polarizing axis a is set to in the horizontal direction.

The orientation of the polarizing axis b of the second polarizer 20B is set to in a range in which the light passing through the liquid crystal display panel 10 is able to be transmitted. For example, in the case where the orientation of the polarizing axis a of the first polarizer 20A is in the extending direction of the convex section 33a (horizontal direction), the orientation of the polarizing axis b of the second polarizer 20B is set to in the direction orthogonal to the polarizing axis a of the first polarizer 20A (vertical direction) as shown in FIG. 1.

Figure 4:
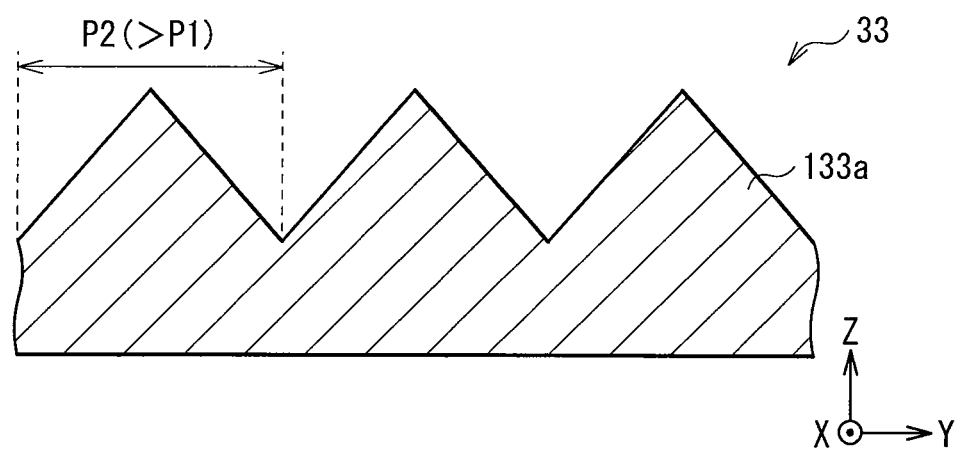
FIG. 4 A cross section view and a rear face view for explaining an example of a method of forming the luminance enhancement film of FIG. 1.
Figure 5A:
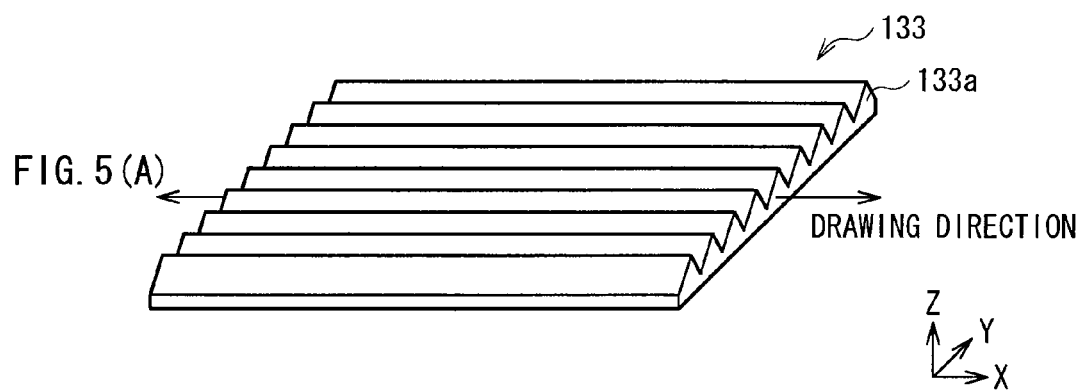
FIG. 5 A perspective view and a cross section view for explaining a step following FIG. 4.
Figure 5B:
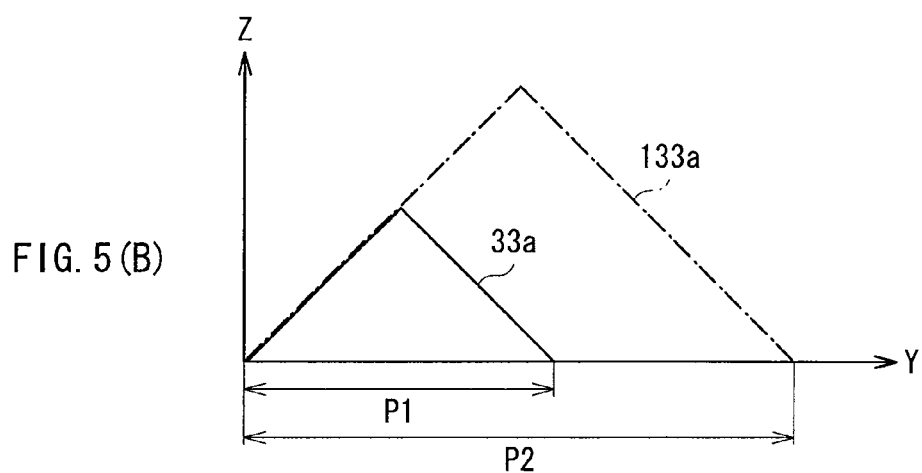

Next, a description will be given of an example of a method of forming the luminance enhancement film 33 of this embodiment with reference to FIG. 4, FIG. 5(A), and FIG. 5(B). FIG. 4 is a cross sectional structure diagram of an after-mentioned luminance enhancement film 133. FIG. 5(A) is a perspective view of the luminance enhancement film 133. FIG. 5(B) is a cross section view of the convex section 33a and a convex section 133a.

First, a plurality of convex sections 133a having pitch P2 (>P1) are formed on one face (front face) of a resin film made of a material showing positive birefringence (FIG. 4). Thereby, the luminance enhancement film 133 having the plurality of convex sections 133a on the front face is formed.

The luminance enhancement film 133 may be formed by, for example, thermal press method, melt extrusion processing method or the like. Further, the luminance enhancement film 133 may be formed by using a flat resin sheet as a base and bonding the plurality of convex sections 133a onto the front face of the resin sheet.

Next, the luminance enhancement film 133 is stretched in the extending direction of the convex section 133a (FIG. 5(A)). Thereby, the convex section 133a is stretched in the drawing direction to become the convex section 33a. In this case, since the convex section 133a is made of the resin showing positive birefringence, the convex section 33a will have the refractive index anisotropy in which the refractive index in the extending direction is larger than the refractive index in the arrangement direction by being stretched.

At this time, as shown in FIG. 5(B), the pitch P1 of the convex section 33a is smaller than pitch P3 of the convex section 133a. However, the cross sectional shape in the direction orthogonal to the drawing direction of the convex section 33a is similar to the cross sectional shape of the convex section 133a before being stretched. That is, it is found that in the case where the luminance enhancement film 133 is stretched in the extending direction of the convex section 133a, the optical characteristics derived from the cross sectional shape in the direction orthogonal to the drawing direction of the luminance enhancement film 33 after being stretched are rarely changed from those of the luminance enhancement film 133 before being stretched. Thereby, the shape of the luminance enhancement film 33 after being stretched is able to be precisely controlled.

In addition, the luminance enhancement film 33 may be also formed by, for example, the following method.

Figure 6:
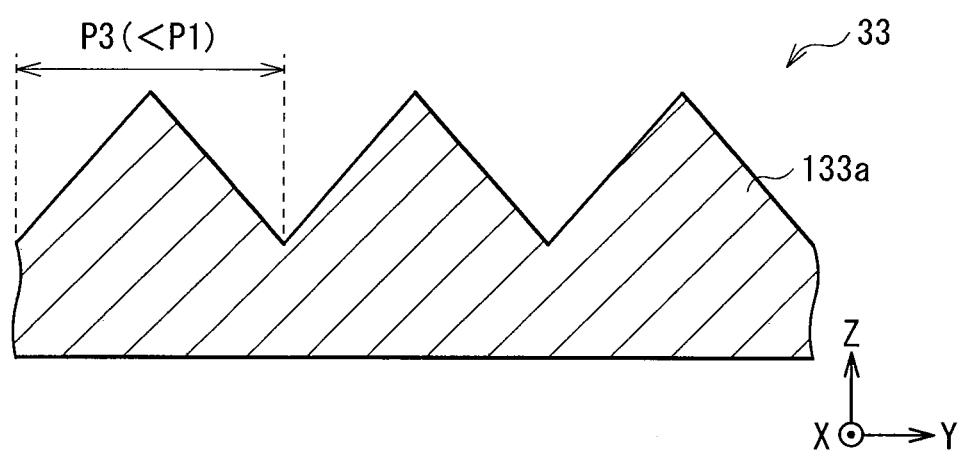
FIG. 6 A cross section view and a rear face view for explaining another example of a method of forming the luminance enhancement film of FIG. 1.
Figure 7A:
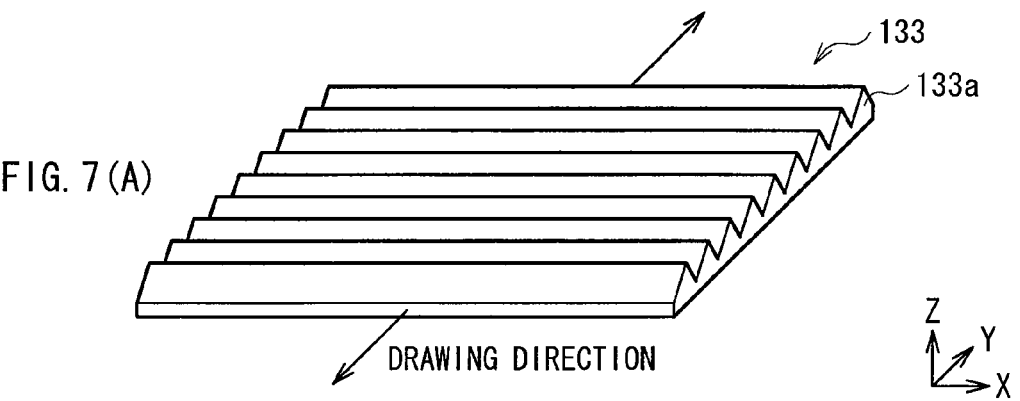
FIG. 7 A perspective view and a cross section view for explaining a step following FIG. 6.
Figure 7B:
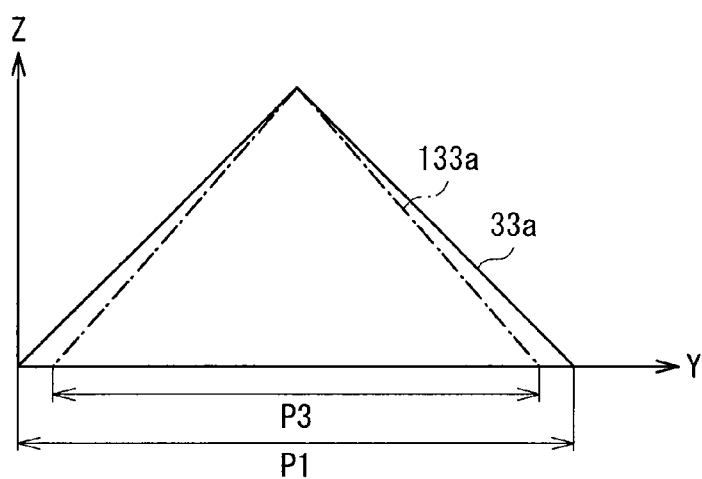

FIG. 6 is a cross sectional structure view of the luminance enhancement film 133. FIG. 7(A) is a perspective view of the luminance enhancement film 133. FIG. 7(B) is a cross section view of the convex section 33a and the convex section 133a.

First, the plurality of convex sections 133a having the pitch P3 (<P1) are formed on one face (front face) of a resin film made of a material having negative birefringence (FIG. 6). Thereby, the luminance enhancement film 133 having the plurality of convex sections 133a on the front face is formed. In addition, in this case, the luminance enhancement film 133 may be formed by using a method similar to the foregoing method as well.

Next, the luminance enhancement film 133 is stretched in the direction crossing (orthogonal to) the extending direction of the convex section 133a (FIG. 7(A)). Thereby, the convex section 133a is stretched in the drawing direction to become the convex section 33a. In this case, since the convex section 133a is made of the resin showing negative birefringence, the convex section 33a will have the refractive index anisotropy in which the refractive index in the extending direction is larger than the refractive index in the arrangement direction by being stretched.

At this time, as shown in FIG. 7(B), the pitch P1 of the convex section 33a is larger than the pitch P3 of the convex section 133a. That is, it is found that the optical characteristics of the luminance enhancement film 33 after being stretched are slightly changed from the optical characteristics of the luminance enhancement film 133 before being stretched in the case where the convex section 133a is stretched in the arrangement direction of the convex section 133a, since the cross sectional shape of the convex section 33a is a shape obtained by stretching the cross sectional shape of the convex section 133a in the drawing direction (arrangement direction). Therefore, in this case, it is necessary to form the shape of the luminance enhancement film 133 before being stretched based on prediction of the shape of the luminance enhancement film 33 after being stretched.

Figure 8:
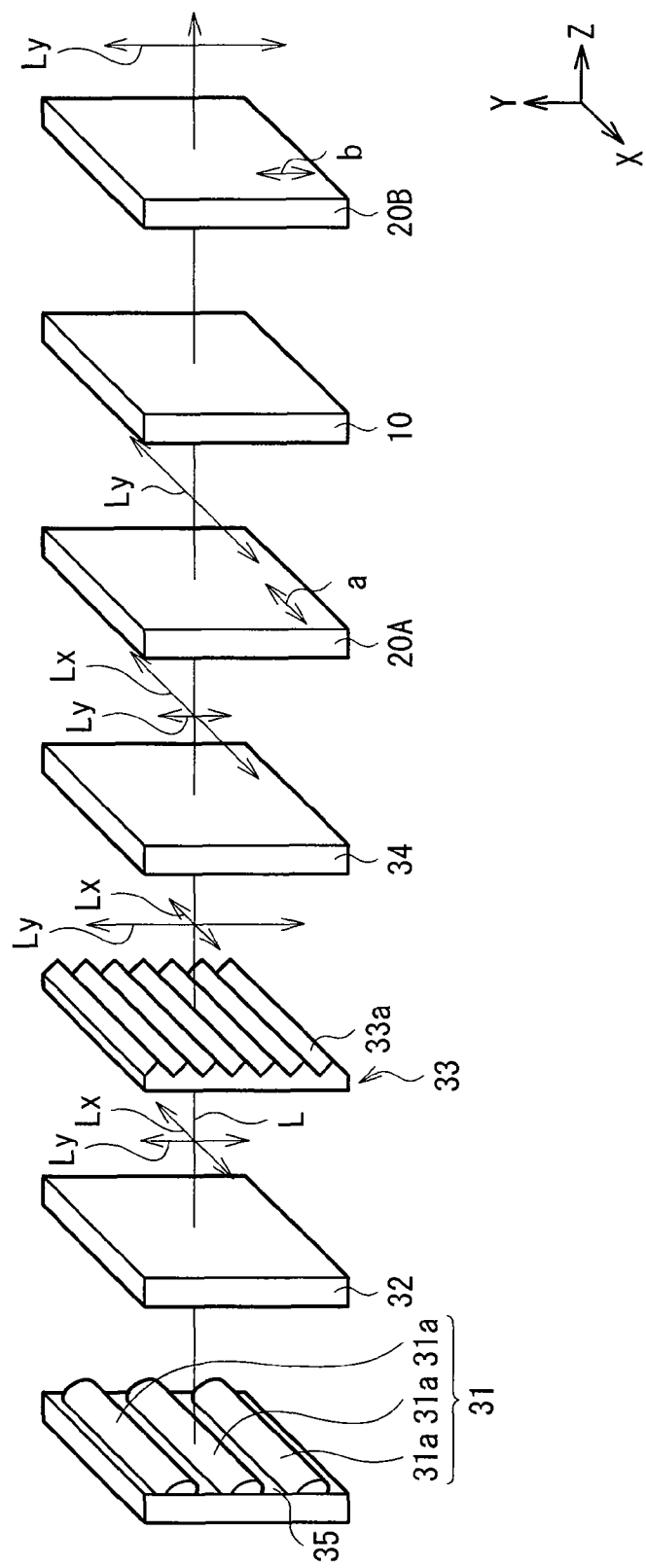
FIG. 8 A conceptual diagram for explaining an operation of the display unit of FIG. 1.

Next, a description will be given of an example of basic operations in the case where an image is displayed in the display unit 1 according to this embodiment with reference to FIG. 8. FIG. 8 schematically shows the example of the basic operations of the display unit 1.

Non-polarized light L that has been emitted from the lighting device 30 and passed through the diffusion sheet 32 enters the rear face of the luminance enhancement film 33. Then, due to the shape anisotropy of the convex section 33a, the component mainly in the arrangement direction of each convex section 33A out of the light L is refracted and transmitted toward the direction orthogonal to the liquid crystal display panel 10, and the directivity is increased. Further, due to the refractive index anisotropy of the luminance enhancement film 33, the light L is split into the polarization component Lx in the extending direction of each convex section 33a and the polarization component Ly in the arrangement direction of each convex section 33a.

At this time, the polarization component Ly in the arrangement direction of each convex section 33a is refracted and transmitted through the luminance enhancement film 33 and enters the wave plate 34. Meanwhile, the polarization component Lx in the extending direction of each convex section 33a is reflected by the rear face of the luminance enhancement film 33 and the light emitting face of the convex section 33a, and is returned to the light source 31 side. Then, the returned light is reflected by the front face of the diffusion sheet 32 or the reflection sheet 35 of the lighting device 30, becomes non-polarized light, and again enters the luminance enhancement film 33. As a result of such recycling being repeated, in the light passing through the luminance enhancement film 33, the polarization component Ly in the arrangement direction of each convex section 33a becomes extremely larger than the polarization component Lx in the extending direction of each convex section 33a.

After that, the light passing through the luminance enhancement film 33 passes through the wave plate 34, and then enters the first polarizer 20A. At this time, the wave plate 34 rotates the polarizing axis of the light passing through the luminance enhancement film 33 so that an angle made by the polarizing axis of the light passing through the luminance enhancement film 33 and the polarizing axis a of the first polarizer 20A becomes small (preferably 0 degree).

Subsequently, out of the light L entering the first polarizer 20A, the polarization component Lx crossing the polarizing axis a is absorbed into the first polarizer 20A, and the polarization component Ly in parallel with the polarizing axis a passes through the first polarizer 20A. Ly passing through the first polarizer 20A is provided with polarization control by pixel unit in the liquid crystal display panel 10, and enters the second polarizer 20B. Only polarized light of the polarizing axis b of the second polarizer 20B is transmitted to form an image on the front face of the panel. Accordingly, the image is displayed in the display unit 1.

By the way, in this embodiment, each convex section 33a of the luminance enhancement film 33 is extended toward the horizontal direction and is arranged in the direction crossing the extending direction. Thus, it is possible that the light mainly divergent in the arrangement direction out of the illuminating light from the light source 31 is raised in the direction orthogonal to the liquid crystal display panel 10 (front face direction) to be collected. Thereby, while the front luminance is improved, the view angle in the horizontal direction of the light passing through the second polarizer 20B is able to be made wider than the view angle in the vertical direction. As a result, in the case where the display unit 1 is arranged in the living room or the like, the commercial value of the display unit 1 is able to be improved.

Further, in the case where each convex section 33a of the luminance enhancement film 33 is extended in the horizontal direction and is arranged in the direction orthogonal to the extending direction (vertical direction), the view angle in the horizontal direction of the light passing through the second polarizer 20B is able to made wider than that in the foregoing case.

Further, in this embodiment, the refractive index in the extending direction of each convex section 33a is larger than the refractive index in the arrangement direction of each convex section 33a. Thus, the reflection amount of the polarization component in the extending direction of each convex section 33a becomes larger than the reflection amount in the arrangement direction of each convex section 33a. Thereby, in the light passing through the luminance enhancement film 33, the light amount of the polarization component in the arrangement direction of each convex section 33a is able to be larger than the light amount of the polarization component in the extending direction of each convex section 33a. Further, by using the wave plate 34, an angle made by a polarization direction of the polarization component in the arrangement direction of each convex section 33a (polarization component in the polarizing axis direction) after passing through the wave plate 34 among light passing through the luminance enhancement film 33 and the direction of the polarizing axis a of the first polarizer 20A is small (or 0 degree). Thus, the polarization component in the polarizing axis direction of the light passing through the luminance enhancement film 33 is able to pass through the first polarizer 20A while keeping its absorption into the first polarizer 20A low. Thereby, compared to a case not using the wave plate 34, the light use efficiency is improved and the front luminance is improved.

Further, in this embodiment, the polarization direction of the light entering the wave plate 34 is changed so that the angle made by the polarizing axis of the luminance enhancement film 33 and the polarizing axis a of the first polarizer 20A is small, preferably 0 degree by using the wave plate 34. Thus, the light having the polarization component in the vertical direction is able to be emitted from the second polarizer 20B, which has been difficult in the display unit shown in FIG. 22. Thereby, the light passing through the second polarizer 20B is able to be viewed with the use of a polarized sunglass.

Therefore, in this embodiment, the view angle in the horizontal direction of emitting light is wider than the view angle in the vertical direction, the emitting light has a polarization component in the vertical direction viewable with the use of a polarized sunglass, and the display luminance is able to be further improved.

Further, in this embodiment, the luminance enhancement film 33 is provided in the lighting device 30. Thus, it is not necessary to change the internal structure of the liquid crystal display panel 10 (in particular, the first polarizer 20A and the second polarizer 20B). Thereby, as the liquid crystal display panel 10, a general liquid crystal display panel distributed in the market is able to be used, and thus the manufacturing cost is able to be inhibited from being increased.

Modified Example of the First Embodiment

Figure 9A:
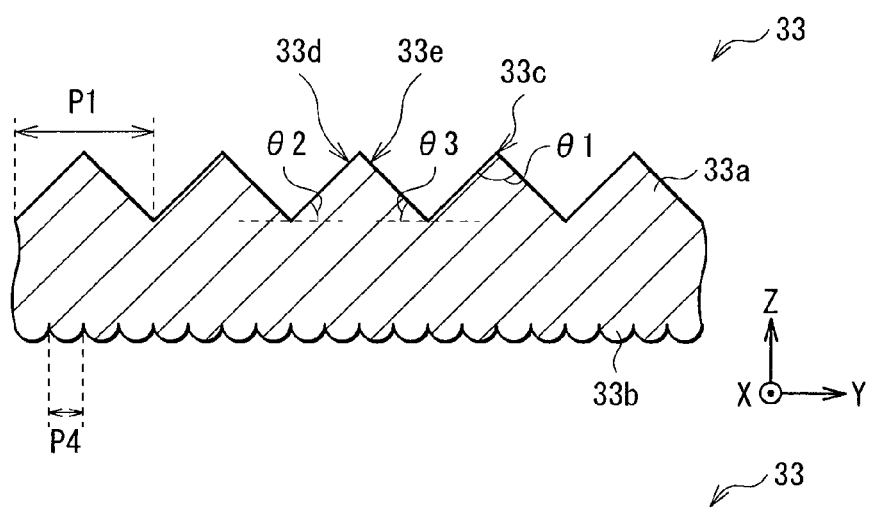
FIG. 9 A cross section view and a rear face view showing a modified example of the structure of the luminance enhancement film of FIG. 1.
Figure 9B:
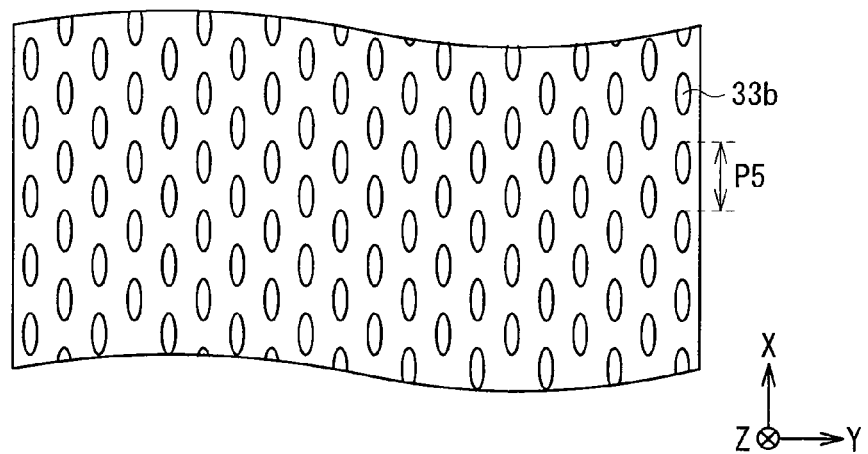

In the foregoing embodiment, as an example, the description has been given of the case where the face on the light incidence side (rear face) of the luminance enhancement film 33 is the plane face. However, for example, as shown in FIGS. 9(A) and 9(B), a plurality of convex sections 33b may be formed on the rear face of the luminance enhancement film 33. FIG. 9(A) is an enlarged cross section view of an example of a cross section of the luminance enhancement film 33. FIG. 9(B) is a plan view schematically showing the rear face of the luminance enhancement film 33.

The plurality of convex sections 33b extend and are arranged in parallel in a given direction in a plane in parallel with a face including the luminance enhancement film 33, and are also arranged in parallel in the direction crossing the extending direction. In this case, the extending direction of the convex section 33a and the extending direction of the convex section 33b are oriented in the same direction. That is, the axis of the shape anisotropy of the convex section 33a and the axis of the shape anisotropy of the convex section 33b are preferably in parallel with each other, but may be oriented in a direction different from each other.

Each convex section 33b extends, for example, as shown in FIGS. 9(A) and 9(B), in the direction almost in parallel with the extending direction of the convex section 33a. The convex section 33b has a columnar shape in which the length in the extending direction of each convex section 33b is shorter than the length in the extending direction of each convex section 33a. A width (pitch P4) in the direction orthogonal to the extending direction of each convex section 33b, a width (pitch P5) in the extending direction of each convex section 33b, the shape of each convex section 33b, the number of convex sections 33b, the haze value of each convex section 33b and the like are set as appropriate according to the intended usage. Each convex section 33b is not necessarily arranged regularly, but may be arranged at random.

Each convex section 33b may have a curved face shape (for example, cylindrical shape) such as an oval shape and an aspheric shape in the direction orthogonal to the extending direction of each convex section 33b as shown in FIGS. 9(A) and 9(B). Otherwise, each convex section 33b may be in the shape of a polygonal pole having at least one plane face in the direction orthogonal to the extending direction of each convex section 33b. Otherwise, each convex section 33b may be in the shape of a pole extending in the direction crossing the extending direction of each convex section 33a, for example.

Further, each convex section 33b does not necessarily have the same shape and the same size as those of other convex sections 33b. For example, (A) a space structure composed of a pair of two adjacent convex sections 33b having an identical shape in which one thereof is high (large) and the other thereof is low (small) may be arranged at intervals of an equal pitch in the direction orthogonal to the extending direction of each convex section 33b; for example, (B) a space structure composed of a pair of two adjacent convex sections 33b having an identical height and a different shape may be arranged at intervals of an equal pitch in the direction orthogonal to the extending direction of each convex section 33b; and for example, (C) a space structure composed of a pair of two adjacent convex sections 33b having a different shape and a different size (height) may be arranged at intervals of an equal pitch in the direction orthogonal to the extending direction of each convex section 33b. It is also possible to provide a plurality of convex sections and concave sections in the extending direction of each convex section 33b.

Thereby, each convex section 33b refracts and transmits the component in the direction orthogonal to the extending direction of each convex section 33b out of the light entering the rear face side of the luminance enhancement film 33 toward the direction in parallel with the liquid crystal display panel 10 to reduce the directivity. In addition, in each convex section 33b, diffusion effect due to refraction action of each convex section 33b is little for the component in the extending direction of each convex section 33b out of the light entering from the rear face side of the luminance enhancement film 33. That is, in each convex section 33b, anisotropy is generated in the haze degree resulting from the shape anisotropy of each convex section 33b.

In addition, the axis of the shape anisotropy of each convex section 33a is preferably in parallel with the axis of the shape anisotropy of each convex section 33b. For example, the extending direction of each convex section 33a is preferably in parallel with the extending direction of each convex section 33b. In this case, the axis of the anisotropy of the light collection effect of each convex section 33a becomes in parallel with the axis of the anisotropy of the haze degree of each convex section 33b. Thereby, compared to a case where the rear face of the luminance enhancement film 33 is not provided with each convex section 33b, the difference between the size of the view angle in the horizontal direction of the light passing through the luminance enhancement film 33 and the size of the view angle in the vertical direction thereof becomes small.

By the way, in this modified example, in each convex section 33b, the refractive index in the extending direction of each convex section 33a may be different from the refractive index in the arrangement direction of each convex section 33a. However, in the case where in each convex section 33b, the refractive index in the extending direction of each convex section 33a is different from the refractive index in the arrangement direction of each convex section 33a, the magnitude relation between the refractive index in the extending direction of each convex section 33a in each convex section 33a and the refractive index in the arrangement direction of each convex section 33a in each convex section 33a is equal to magnitude relation between the refractive index in the extending direction of each convex section 33a in each convex section 33b and the refractive index in the arrangement direction of each convex section 33a in each convex section 33b. That is, both each convex section 33a and each convex section 33b have the in-plane refractive index anisotropy in which the refractive index in the direction in parallel with the polarizing axis a is smaller than the refractive index in the direction orthogonal to the polarizing axis a.

As above, in this modified example, in the case where both each convex section 33a and each convex section 33b have the in-plane refractive index anisotropy in which the refractive index in the direction in parallel with the polarizing axis a is smaller than the refractive index in the direction orthogonal to the polarizing axis a, by reflecting light more in the direction orthogonal to the polarizing axis a and recycling the returned light, light in the direction in parallel with the polarizing axis a is able to be increased. Therefore, the transmission characteristics of light entering the luminance enhancement film 33 is able to be changed according to the polarization state.

In this case, as described in the foregoing embodiment, the in-plane anisotropy of the refractive index is able to be generated by stretching a sheet containing a semicrystalline or crystalline resin in one direction. For example, the in-plane anisotropy of the refractive index is able to be also generated by using a crystalline material having refractive index anisotropy. Further, in terms of simplification of the manufacturing process, the entire luminance enhancement film 33 is preferably made of an identical material. However, only each convex section 33a and each convex section 33b may be made of the same material, or each convex section 33a and each convex section 33b may be made of a material different from each other.

Next, a description will be given of a function of the luminance enhancement film 33 in the case where in the refractive index of the entire luminance enhancement film 33, the refractive index in the extending direction of each convex section 33a is different from that in the arrangement direction of each convex section 33a.

Figure 10:
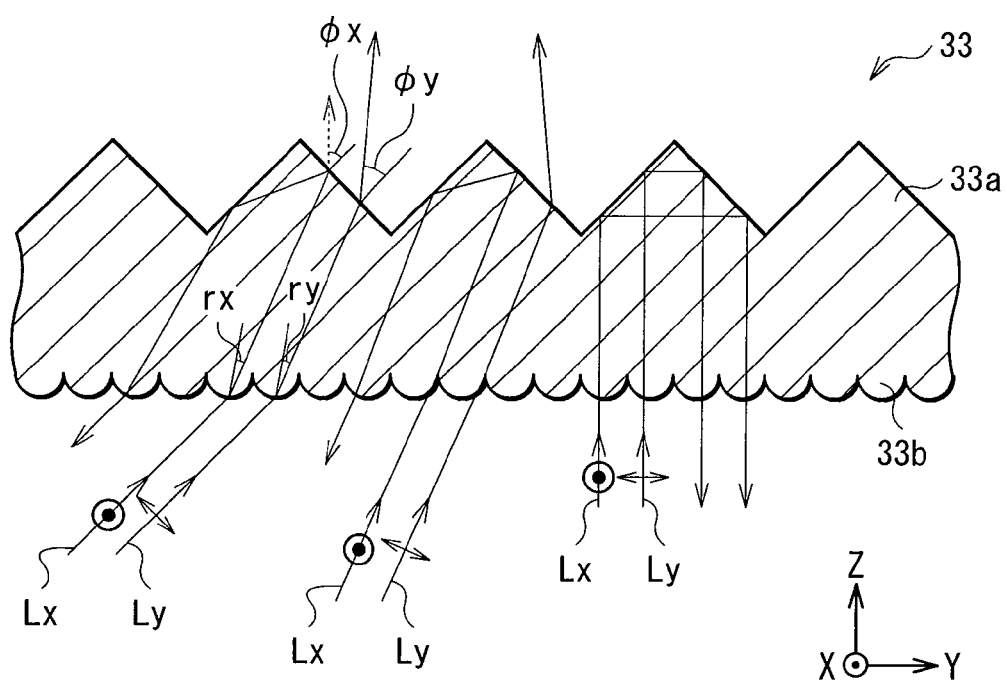
FIG. 10 A characteristics diagram showing transmission characteristics of the luminance enhancement film of FIG. 9.

FIG. 10 shows an example of a light path in the case where light of the lighting device 30 enters from the rear face of the luminance enhancement film 33, in the case where the entire luminance enhancement film 33 is made of a material in which the refractive index nx in the extending direction of each convex section 33a is larger than the refractive index ny in the arrangement direction of each convex section 33a (nx>ny). In addition, in FIG. 10, Lx represents a polarization component oscillating in the extending direction (X direction) of each convex section 33a out of the light of the lighting device 30. Ly represents a polarization component oscillating in the arrangement direction (Y direction) of each convex section 33a out of the light of the lighting device 30.

In the light of the lighting device 30 entering from the diagonal direction with respect to a face including the luminance enhancement film 33, the refractive index of each convex section 33a and each convex section 33b in the extending direction of each convex section 33a is different from the refractive index of each convex section 33a and each convex section 33b in the arrangement direction of each convex section 33a (nx>ny in FIG. 10). Thus, the X-direction polarization component Lx and the Y-direction polarization component Ly of the light of the lighting device 30 are refracted by the rear face of the luminance enhancement film 33 (light incidence face of the convex section 33b) at refractive angles rx and ry different from each other (rx<ry in FIG. 10), and are emitted from the front face of the luminance enhancement film 33 (light emitting face of each convex section 33a) at emitting angles φx and φy (φx>φy in FIG. 10) different from each other.

At this time, in the luminance enhancement film 33, the refractive index in the extending direction of each convex section 33a is different from the refractive index in the arrangement direction of each convex section 33a (nx>ny in FIG. 10). Thus, the respective polarization components oscillating in the respective directions are reflected by an interface such as the light incidence face of the convex section 33b and the light emitting face of the convex section 33a at reflectance different from each other. Therefore, as exemplified in FIG. 10, in the case where in the entire luminance enhancement film 33, the refractive index nx in the extending direction of each convex section 33a is larger than the refractive index ny in the arrangement direction of each convex section 33a (Case A), the reflection amount of Lx becomes larger than the reflection amount of Ly. Thus, in the light passing through the luminance enhancement film 33, the light amount of Ly becomes larger than the light amount of Lx. On the contrary, in the case where in the entire luminance enhancement film 33, the refractive index ny in the arrangement direction of each convex section 33a is larger than the refractive index nx in the extending direction of each convex section 33a (Case B), the reflection amount of Ly becomes larger than the reflection amount of Lx. Thus, in the light passing through the luminance enhancement film 33, the light amount of Lx becomes larger than the light amount of Ly.

In addition, in the luminance enhancement film 33, the refractive index in the extending direction of each convex section 33a is different from the refractive index in the arrangement direction of each convex section 33a (nx>ny in FIG. 10). Thus, the respective polarization components oscillating in the respective directions have a critical angle different from each other on an interface such as the rear face of the luminance enhancement film 33 and the light incidence face of the convex section 33a. Therefore, in the case of Case A, as exemplified in the central part of FIG. 10, in the light entering at a certain incident angle, when the angle at which the light enters the light emitting face is larger than the critical angle of Lx and smaller than the critical angle of Ly, Lx is totally reflected and Ly is transmitted on the light emitting face. Therefore, the polarization component Lx is repeatedly reflected totally by the light emitting face of each convex section 33a to become the returned light, and a total polarization split state in which only the polarization component Ly passes through the light emitting face of each convex section 33a can be realized. On the contrary, in the case of Case B, in the light entering at a certain incident angle, when the angle at which the light enters the light emitting face is larger than the critical angle of Ly and smaller than the critical angle of Lx, Ly is totally reflected and Lx is transmitted on the light emitting face. Therefore, the polarization component Ly is repeatedly reflected totally by the light emitting face of each convex section 33a to become the returned light, and a total polarization split state in which only the polarization component Lx passes through the light emitting face of each convex section 33a can be realized.

Further, if the incident angle of light of the lighting device 30 to the light emitting face of each convex section 33a is excessively large, in both Case A and Case B, as shown in the right side of FIG. 10, the light of the lighting device 30 is repeatedly reflected totally by the light emitting face of each convex section 33a to become the returned light back to the lighting device 30 side regardless of the polarization state.

As described above, in the case where the entire luminance enhancement film 33 is provided with the in-plane refractive index anisotropy, the luminance enhancement film 33 is able to obtain certain polarization split effect in addition to light collection action of light of the lighting device 30.

At this time, in the case where the axis of the refractive index anisotropy of each convex section 33a is in parallel with the axis of the refractive index anisotropy of each convex section 33b, that is, in the case where the direction where the refractive index in each convex section 33a is smallest is in parallel with the direction where the refractive index in each convex section 33b is smallest, both each convex section 33a and each convex section 33b selectively transmit one polarization component (Ly in FIG. 10), and selectively reflect other polarization component (Lx in FIG. 10). Then, the light reflected by the light emitting face of each convex section 33a or the light incidence face of each convex section 33b is reflected by the reflection sheet 35 of the lighting device 30 (FIG. 1) or the front face of the diffusion sheet 32, is non-polarized, and again enters the luminance enhancement film 33. Thereby, compared to a case where the direction where the refractive index in each convex section 33a is smallest crosses the direction where the refractive index in each convex section 33b is smallest, or in the case where only one of each convex section 33a and each convex section 33b has polarization split action, the light amount of one polarization component (Ly in FIG. 10) is able to be extremely larger than the light amount of the other polarization component (Lx in FIG. 10). As a result, the light use efficiency is improved, and the front luminance is improved.

In addition, in the case where each convex section 33b does not have polarization split action, light use efficiency is lower than that in the case where both each convex section 33a and each convex section 33b have polarization split action but is higher than that in the case where both each convex section 33a and each convex section 33b do not have polarization split action, and thus the front luminance is improved.

Further, in the case where the axis of the shape anisotropy of each convex section 33a (extending direction) is in parallel with the axis of the refractive index anisotropy of the luminance enhancement film 33, the axis of the anisotropy of the haze degree resulting from the shape anisotropy of each convex section 33b becomes in parallel with the axis of the refractive index anisotropy. Thereby, when the light entering from the rear face side of the luminance enhancement film 33 is polarized and split by the luminance enhancement film 33, the polarized and split light is not non-polarized and is emitted from the luminance enhancement film 33. Thereby, by appropriately adjusting the magnitude of the haze degree, the lowering degree of the front luminance increased resulting from the refractive index anisotropy of the luminance enhancement film 33 caused by the diffusion effect of each convex section 33b is able to be minimized.

Figure 11:
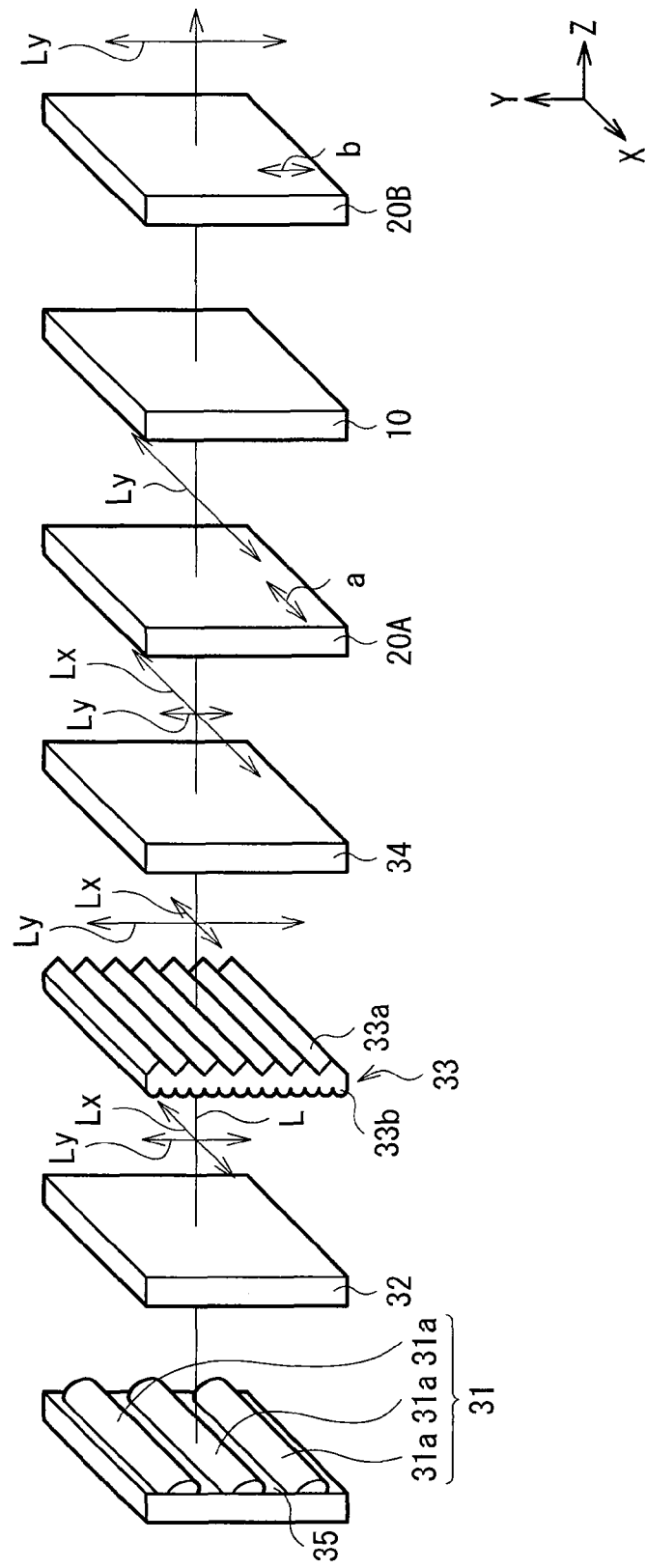
FIG. 11 A conceptual diagram for explaining an operation of a display unit including the luminance enhancement film of FIG. 9.

Next, a description will be given of basic operations in the case where an image is displayed in the display unit 1 according to this modified example with reference to FIG. 11. FIG. 11 schematically shows an example of the basic operations of the display unit 1.

Non-polarized light L that is emitted from the lighting device 30 and passes through the diffusion sheet 32 enters the rear face of the luminance enhancement film 33. The light L is diffused in the convex section 33b, and is increased in the directivity in the convex section 33a. Further, the light L at this time is split into the polarization component (Ly in FIG. 11) in parallel with the polarizing axis a of the first polarizer 20A due to action of at least the convex section 33a between the convex section 33a and the convex section 33b.

At this time, the polarization component Ly in the arrangement direction of each convex section 33a is refracted and transmitted through the luminance enhancement film 33 and enters the wave plate 34. Meanwhile, the polarization component Lx in the extending direction of each convex section 33a is reflected by the rear face of the luminance enhancement film 33 and the light emitting face of the convex section 33a, and is returned to the light source 31 side. Then, the returned light is reflected by the front face of the diffusion sheet 32 or the reflection sheet 35 of the lighting device 30, becomes non-polarized light, and again enters the luminance enhancement film 33. By repeating such recycling, in the light passing through the luminance enhancement film 33, the polarization component Ly in the arrangement direction of each convex section 33a becomes extremely larger than the polarization component Lx in the extending direction of each convex section 33a.

After that, the light passing through the luminance enhancement film 33 passes through the wave plate 34, and then enters the first polarizer 20A. At this time, the wave plate 34 rotates the polarizing axis of the light passing through the luminance enhancement film 33 so that the angle made by the polarizing axis of the light passing through the luminance enhancement film 33 and the polarizing axis a of the first polarizer 20A becomes small (preferably 0 degree).

Subsequently, out of the light L entering the first polarizer 20A, the polarization component Lx crossing the polarizing axis a is absorbed into the first polarizer 20A, and the polarization component Ly in parallel with the polarizing axis a passes through the first polarizer 20A. The polarization component Ly passing through the first polarizer 20A is provided with polarization control by pixel unit in the liquid crystal display panel 10, and enters the second polarizer 20B. Only polarized light of the polarizing axis b of the second polarizer 20B is transmitted to form an image on the front face of the panel. Accordingly, the image is displayed in the display unit 1.

By the way, in this modified example, at least the convex section 33a between the convex section 33a and the convex section 33b of the luminance enhancement film 33 has the in-plane refractive index anisotropy in which the refractive index in the direction in parallel with the polarizing axis a is smaller than the refractive index in the direction orthogonal to the polarizing axis a. Therefore, out of the light L entering the rear face of the luminance enhancement film 33, the polarization component crossing the polarizing axis a (Lx in FIG. 11) is reflected by the luminance enhancement film 33. Then, the reflected light is reflected by the front face of the diffusion sheet 32 or the reflection sheet 35 of the lighting device 30, becomes non-polarized light, and again enters the luminance enhancement film 33. By repeating such recycling, light extraction efficiency of the light L is improved, and the front luminance is able to be improved.

Further, in this modified example, in the case where the axis of the shape anisotropy of each convex section 33b (extending direction) is in parallel with the axis of the refractive index anisotropy of the luminance enhancement film 33, the axis of the anisotropy of the haze degree resulting from the shape anisotropy of each convex section 33b becomes in parallel with the axis of the refractive index anisotropy. Thereby, when the light entering from the rear face side of the luminance enhancement film 33 is polarized and split by the luminance enhancement film 33, the polarized and split light is not non-polarized and is emitted from the luminance enhancement film 33. Thereby, by appropriately adjusting the magnitude of the haze degree, the lowering degree of the front luminance increased due to the refractive index anisotropy of the luminance enhancement film 33 caused by the diffusion effect of each convex section 33b is able to be minimized.

Further, in this modified example, the plurality of convex sections 33b are formed on the rear face of the luminance enhancement film 33. Thus, in the case where the light transmissive film is deflected due to influence of heat or the like, there is no possibility that the rear face is bonded to a member provided on the rear face side (for example, the diffusion sheet 32). Thereby, possibility of interference unevenness called Newton ring and wet out is able to be eliminated. Further, control is able to be made so that incident light is not collected extremely on the front face by the diffusion effect of the convex section 33b. Thus, possibility that rapid lowering of the luminance view angle called dark band and cutoff occurs is able to be eliminated.

Therefore, in this modified example, the interference unevenness and rapid lowering of the luminance view angle is able to be decreased without lowering the front luminance.

Second Embodiment

Figure 12:
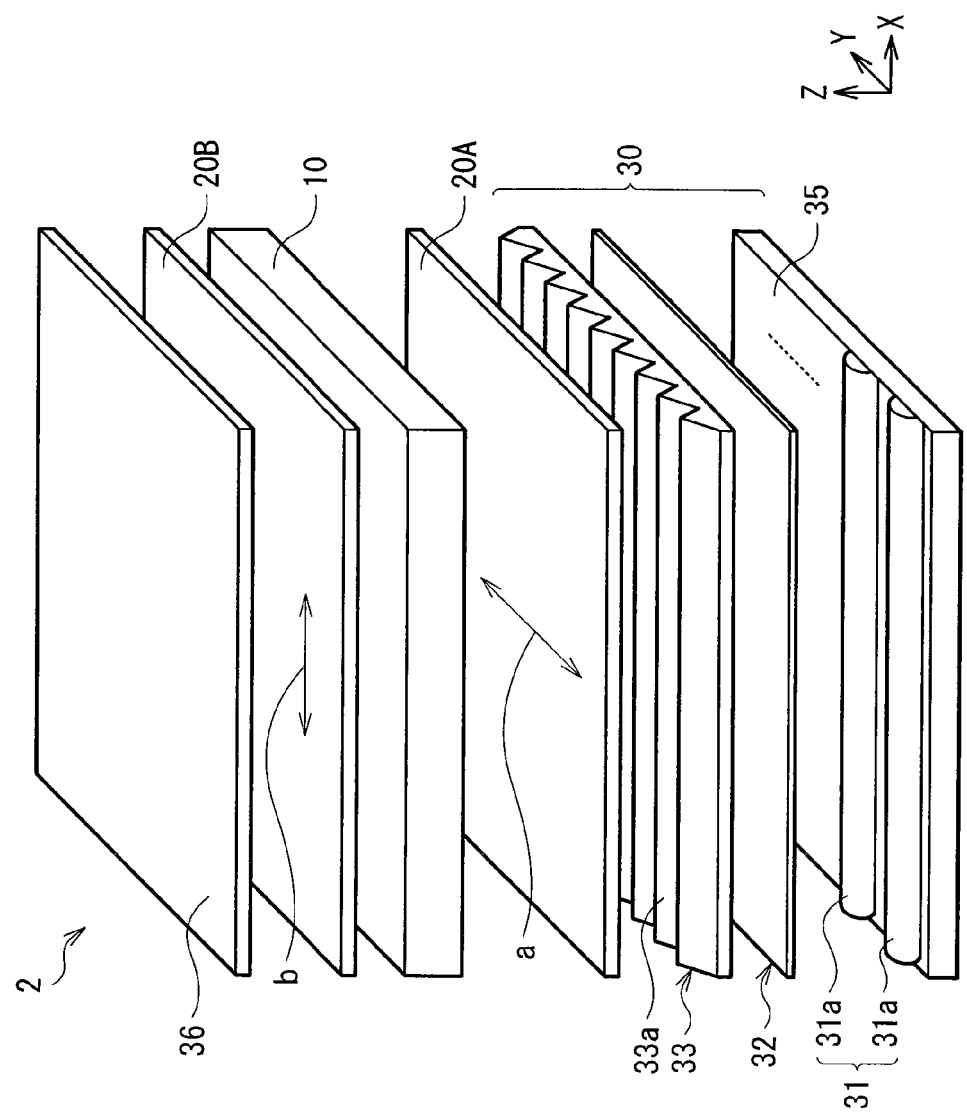
FIG. 12 A perspective view showing an example of a developed configuration of a display unit according to a second embodiment.

FIG. 12 shows a schematic configuration of a display unit 2 according to a second embodiment. The configuration of the display unit 2 is different from the configuration of the foregoing embodiment in that the wave plate 34 in the lighting device 30 is removed, a wave plate 36 is provided on the opposite side to the liquid crystal display panel 10 of the second polarizer 20B (observer side), and in addition, the directions of the polarizing axis a of the first polarizer 20A and the polarizing axis b of the second polarizer 20B are changed. Therefore, a description will be hereinafter given mainly of differences from the foregoing embodiment, and descriptions for configurations, operations, and effects common to those of the foregoing embodiment will be omitted as appropriate.

The orientation of the polarizing axis a of the first polarizer 20A is set to in a range in which light passing through the luminance enhancement film 33 is able to be transmitted. In this embodiment, the orientation of the polarizing axis of the light passing through the luminance enhancement film 33 is in the arrangement direction of the convex section 33a. Thus, as shown in FIG. 9, the orientation of the polarizing axis a of the first polarizer 20A is set to in the direction in parallel with the arrangement direction of the convex section 33a or in the vertical direction.

The orientation of the polarizing axis b of the second polarizer 20B is set to in a range in which light passing through the liquid crystal display panel 10 is able to be transmitted. For example, in the case where the orientation of the polarizing axis a of the first polarizer 20A is in the arrangement direction of the convex section 33a, the orientation of the polarizing axis b of the second polarizer 20B is set to in the direction orthogonal to the polarizing axis a of the first polarizer 20A or in the horizontal direction as shown in FIG. 12.

The wave plate 36 changes the polarization state of light passing through the second polarizer 20B to obtain a polarization component in the vertical direction. For example, the wave plate 36 changes the light passing through the second polarizer 20B into a linear polarized light having an axis other than the axis in the vertical direction, circular polarized light, or elliptically-polarized light.

The wave plate 36 is an optical member capable of changing the polarization state such as a ¼ wavelength plate, a ½ wavelength plate, and a biaxial stretched film. In addition, it is possible that an anti-glare film (AG film) scattering outside light or an antireflection film (AR film) having low reflectance of outside light is provided on the opposite side of the second polarizer 20B of the wave plate 36 (surface on the observer side).

Figure 13:
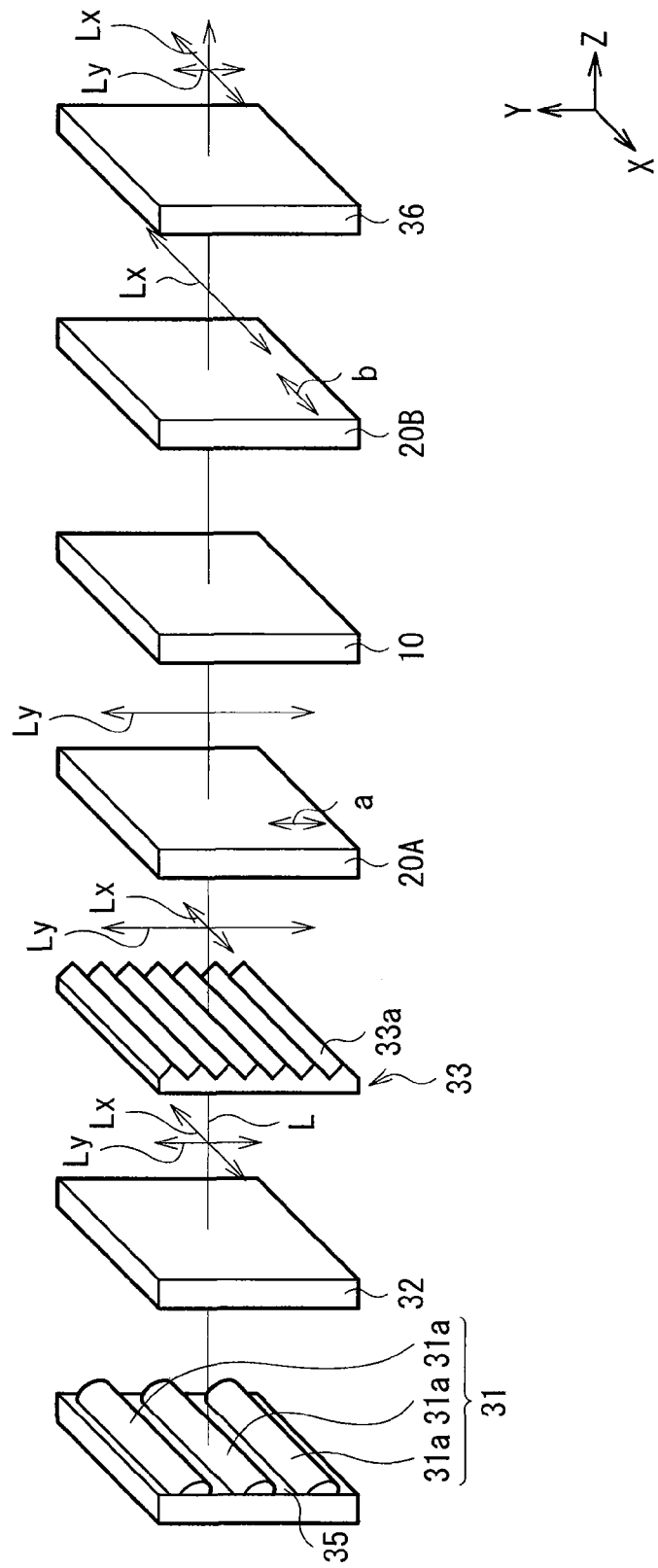
FIG. 13 A conceptual diagram for explaining an operation of the display unit of FIG. 12.

Next, a description will be given of an example of basic operations in the case where an image is displayed in the display unit 2 according to this embodiment with reference to FIG. 13. FIG. 13 schematically shows an example of the basic operations of the display unit 2.

The non-polarized light L that has been emitted from the lighting device 30 and passes through the diffusion sheet 32 enters the rear face of the luminance enhancement film 33. Then, due to the shape anisotropy of the convex section 33a, the component mainly in the arrangement direction of each convex section 33a out of the light L is refracted and transmitted toward the direction orthogonal to the liquid crystal display panel 10, and the directivity is increased. Further, due to the refractive index anisotropy of the luminance enhancement film 33, the light L is split into the polarization component Lx in the extending direction of each convex section 33a and the polarization component Ly in the arrangement direction of each convex section 33a.

At this time, the polarization component Ly in the arrangement direction of each convex section 33a is refracted and transmitted through the luminance improvement film 33 and enters the wave plate 36. Meanwhile, the polarization component Lx in the extending direction of each convex section 33a is reflected by the rear face of the luminance enhancement film 33 and the light emitting face of the convex section 33a, and is returned to the light source 31 side. Then, the returned light is reflected by the front face of the diffusion sheet 32 or the reflection sheet 35 of the lighting device 30, becomes non-polarized light, and again enters the luminance enhancement film 33. By repeating such recycling, in the light passing through the luminance enhancement film 33, the polarization component Ly in the arrangement direction of each convex section 33a becomes extremely larger than the polarization component Lx in the extending direction of each convex section 33a.

After that, the light passing through the luminance enhancement film 33 enters the first polarizer 20A. Then, out of the light L entering the first polarizer 20A, the polarization component Lx crossing the polarizing axis a is absorbed into the first polarizer 20A, and the polarization component Ly in parallel with the polarizing axis a passes through the first polarizer 20A. Ly passing through the first polarizer 20A is provided with polarization control by pixel unit in the liquid crystal display panel 10, and enters the second polarizer 20B. Only polarized light of the polarizing axis b of the second polarizer 20B is transmitted. Subsequently, the light passing through the second polarizer 20B passes through the wave plate 36 to form an image on the front face of the panel. At this time, the wave plate 36 changes the polarization state of the light passing through the second polarizer 20B to generate a polarization component in the vertical direction.

By the way, in this embodiment, each convex section 33a of the luminance enhancement film 33 is extended toward the horizontal direction and is arranged in the direction crossing the extending direction. Thus, it is possible that out of illuminating light from the light source 31, the light mainly divergent in the arrangement direction is raised in the direction orthogonal to the liquid crystal display panel 10 (front face direction) to be collected. Thereby, while improving the front luminance, the view angle in the horizontal direction of the light passing through the second polarizer 20B is able to be made wider than the view angle in the vertical direction thereof.

Further, in the case where each convex section 33a of the luminance enhancement film 33 is extended in the horizontal direction and is arranged in the direction orthogonal to the extending direction (vertical direction), the view angle in the horizontal direction of the light passing through the second polarizer 20B is able to be made wider than that in the foregoing case.

Further, in this embodiment, the refractive index in the extending direction of each convex section 33a is larger than the refractive index in the arrangement direction of each convex section 33a. Thus, the reflection amount of the polarization component in the extending direction of each convex section 33a becomes larger than the reflection amount in the arrangement direction of each convex section 33a. Thereby, in the light passing through the luminance enhancement film 33, the light amount of the polarization component in the arrangement direction of each convex section 33a is able to be larger than the light amount of the polarization component in the extending direction of each convex section 33a. Further, out of the light passing through the luminance enhancement film 33, the orientation of the polarizing axis a of the first polarizer 20A is set to in the direction in parallel with the arrangement direction of each convex section 33a or in the vertical direction. Thus, the polarization component in the arrangement direction of each convex section 33a out of the light passing through the luminance enhancement film 33 is able to pass through the first polarizer 20A, the liquid crystal display panel 10, and the second polarizer 20B, while keeping the absorption thereof into the first polarizer 20A low.

Thereby, compared to a case where the luminance improvement film 33 has no polarization split action, the light use efficiency is improved and the front luminance is improved.

Further, in this embodiment, the second polarizer 20B has the polarizing axis b transmitting the polarization component in the vertical direction. Thus, out of the light entering the second polarizer 20B, all or part of the polarization component in the vertical direction is able to pass through the second polarizer 20B. Thereby, the light passing through the second polarizer 20B is able to be viewed with the use of a sunglass.

Therefore, in this embodiment, the view angle in the horizontal direction of emitting light is wider than the view angle in the vertical direction thereof, the emitting light has the polarization component in the vertical direction viewable with the use of a polarized sunglass, and the display luminance is able to be further improved.

Further, in this embodiment, the wave plate 36 is provided in the liquid crystal display panel 10, and in addition, the orientations of the polarizing axis a of the first polarizer 20A and the polarizing axis b of the second polarizer 20B in the liquid crystal display panel 10 are changed. Thus, it is not necessary to change the internal structure of the illumination unit 30. Thereby, as the lighting device 30, a general lighting device (backlight) distributed in the market is able to be used, and thus the manufacturing cost is able to be inhibited from being increased.

EXAMPLES

First Example

Next, a description will be given of Example 1 of the display unit 1 according to the foregoing first embodiment in contrast with Comparative examples 1 to 3. First, a description will be given of a method of forming light transmissive films according to Example 1 and Comparative examples 1 to 4 and characteristics of the light transmissive films according to Example 1 and Comparative examples 1 to 4 (similarity of cross sectional shapes, shape anisotropy, anisotropy of haze degree, and birefringence).

(Method of Forming Light Transmissive Films According to Example 1 and Comparative Examples 1 to 4)

A metal emboss original plate for thermal press for transferring the convex section 133a to a resin film was prepared. On the front face of the original plate, a concavo-convex shape in which isosceles right triangle poles having an apex angle of 90 degrees and a base angle of 45 degrees was sequentially arranged in parallel with a pitch of 50 μm were carved. As the resin film, an A-PEN (amorphous PEN) sheet (Tg: about 120 deg C.) being 200 μm thick that is a kind of a thermoplastic resin was used. A-PEN is a material that expresses the refractive index anisotropy in which the refractive index in the drawing direction is larger than the refractive index in the direction orthogonal to the drawing direction by being stretched. A-PEN itself does not have the refractive index anisotropy.

The foregoing resin film was sandwiched between the metal emboss original plate and a metal flat plate, and pressed under the thermal press conditions of 150 deg C., 10 minutes, and 100 kgf/cm$^2$ (9.8 MPa). Immediately after that, the resultant was put into ice water and cured. Accordingly, the convex section 133a was transferred to the front face of the resin film. The luminance enhancement film 133 obtained as above was not stretched in the course of manufacturing, and thus did not have the refractive index anisotropy. In addition, the luminance enhancement film 133 was used as a light transmissive film of Comparative example 1.

Next, the luminance enhancement film 133 was cut into a rectangle being 8 cm long (extending direction of the convex section 133a) and 5 cm wide (direction orthogonal to the extending direction of the convex section 133a). After that, the both ends in the longitudinal direction were chucked by a manual stretch machine, and the luminance enhancement film 133 was uniaxially stretched in the longitudinal direction at a drawing rate of 1 cm/sec under the environment of 140 deg C., so that the center of the luminance enhancement film 133 became 3.5 times as large as the original size. Thereby, the convex section 133a was stretched in the longitudinal direction, and the convex section 33a having the refractive index anisotropy was formed. The luminance improvement film 33 obtained as above was used as a light transmissive film of Example 1 and Comparative examples 2 to 4.

(Similarity of Cross Sectional Shapes)

Cross sections in the arrangement direction of the various light transmissive films obtained as above were measured by using a surface roughness measure (Surfcorder ET4001A manufactured by Kosaka Laboratory Ltd.). In the result, the cross sections of the light transmissive film of Example 1 and the light transmissive film of Comparative example 1 were respectively in the shape of isosceles right triangle having the same apex angle of 90 degrees and the same base angle of 45 degrees as the concavo-convex shape of the metal emboss original plate, and were similar to each other. Further, while the convex section 133a of the light transmissive film before being stretched (light transmissive film of Comparative example 1) had the same pitch of about 50 μm as that of the original plate, the convex section 33a of the light transmissive films after being stretched (light transmissive films of Example 1 and Comparative examples 2 to 4) had a narrower pitch of about 30 μm.

(Birefringence)

Figure 14:
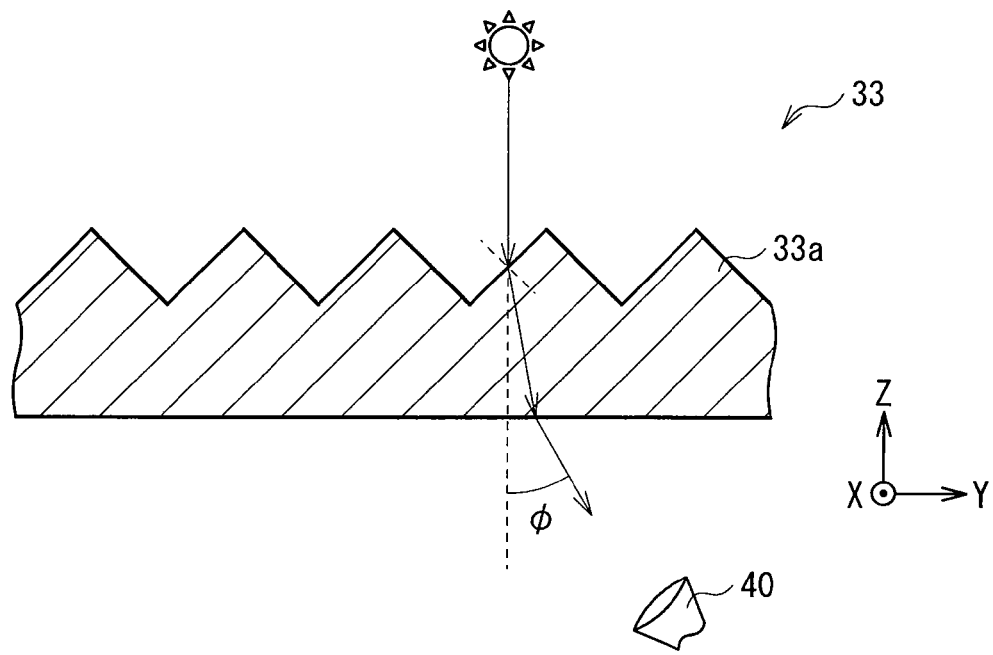
FIG. 14 A conceptual diagram for explaining an example of a method of measuring birefringence.
Figure 15:
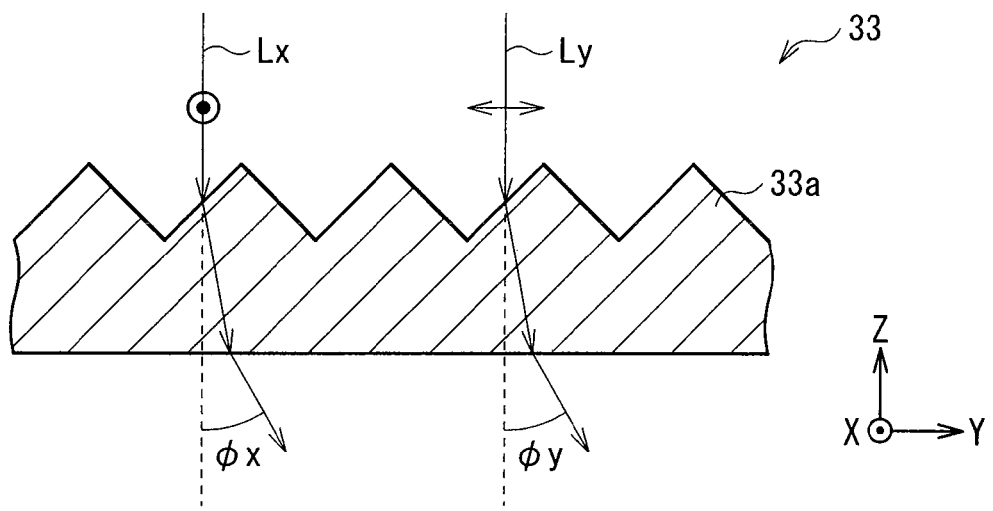
FIG. 15 A conceptual diagram for explaining a polarizing axis of birefringence.
Figure 16:
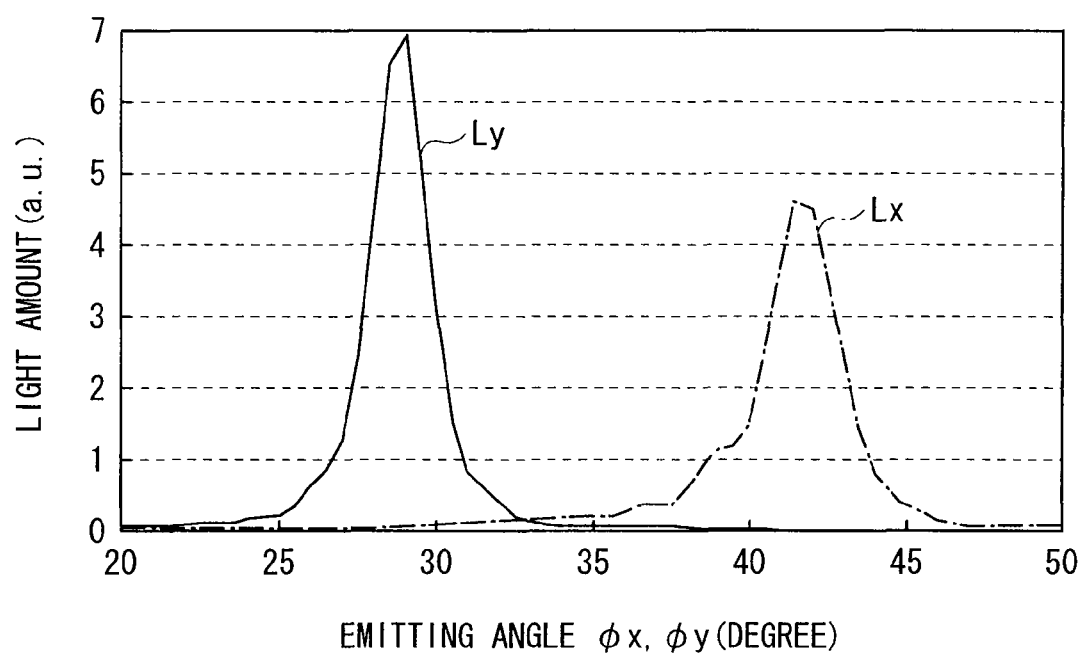
FIG. 16 A relational diagram showing a relation between an emitting angle and a light amount.

Next, the birefringence of the light transmissive films of Example 1 and Comparative examples 2 to 4 obtained as above was measured. To measure the birefringence, as shown in FIG. 14, polarized light was perpendicularly entered from the convex section 33a side of the luminance enhancement film 33, the transmitted light was detected by a measure 40, and difference $\Delta n$ ($=n1-n2$) between refractive index n1 in the extending direction of the convex section 33a and refractive index n2 in the arrangement direction of the convex section 33a was calculated based on the difference of emitting angle φ of the transmitted light. Where the polarization component oscillating in the extending direction of the convex section 33a was the polarized light Lx and the polarization component oscillating in the arrangement direction of the convex section 33a was the polarized light Ly as shown in FIG. 15, emitting angle φ1 of the polarized light Lx was larger than emitting angle φ2 of the polarized light Ly as shown in FIG. 16. In addition, the unit (a.u.) of the vertical axis of FIG. 16 represents arbitrary unit, and means a "relative value."

As a result of the measurement, the refractive index n1 in the extending direction of the luminance enhancement film 33 was 1.79, and the refractive index n2 in the arrangement direction was 1.56. Thus, the difference between the refractive indices $\Delta n$ was 0.23. Accordingly, by thermally pressing the A-PEN sheet to form the convex section 33a and then uniaxially stretching the resultant, a light transmissive film having the different refractive indices between in the extending direction of the convex section 33a and in the arrangement direction of the convex section 33a was able to be obtained. Further, as shown in FIG. 16, it was possible to confirm that the transmittance of the polarized light Ly was higher than that of the polarized light Lx. This is because since the refractive index n1 of the luminance enhancement film 33 in the extending direction of the convex section 33a is larger than the refractive index n2 of the luminance enhancement film 33 in the arrangement direction of the convex section 33a, the total reflection action on the light emitting face of the convex section 33a and on the light incidence face of the luminance enhancement film 33 of the polarized light Lx became high, and the amount of the transmitted light thereof is lowered compared to that of the polarized light Ly.

(Front Luminance, Illuminance, Alignment Luminance, View Angle, and Color Difference)

Figure 17:
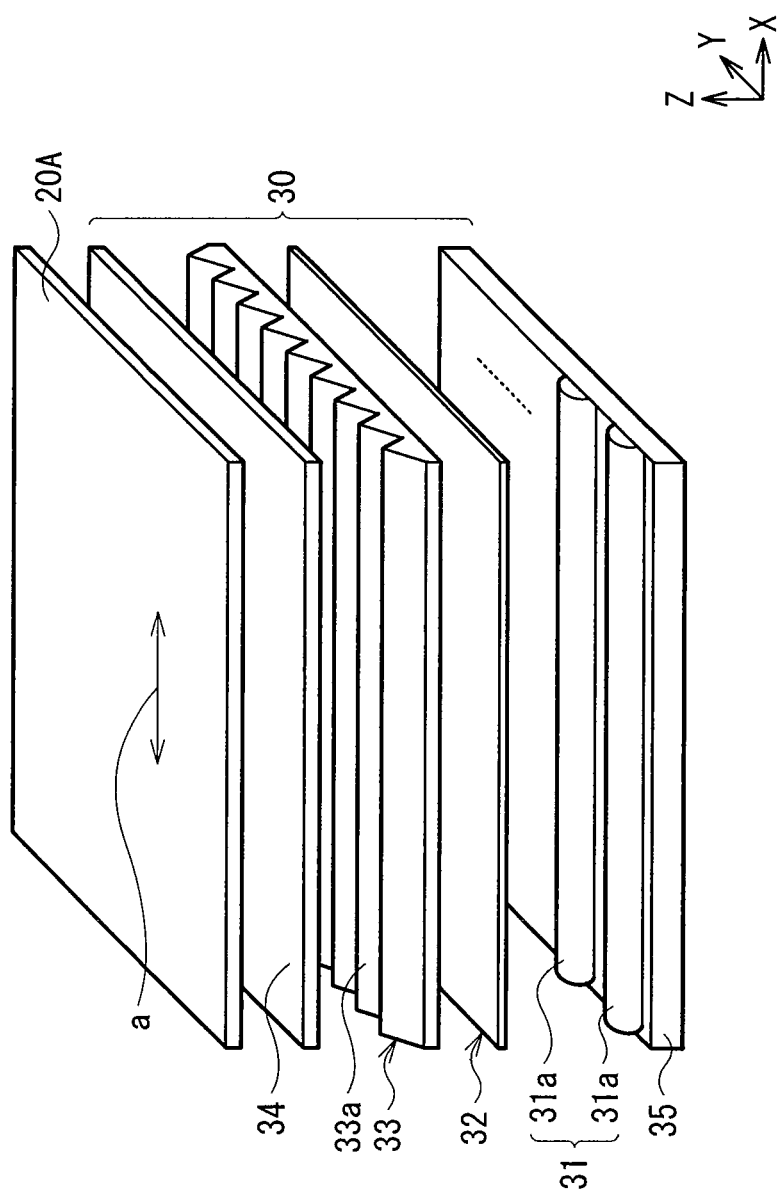
FIG. 17 A perspective view showing an example of a developed configuration of a display unit according to Example 1.
Figure 19:
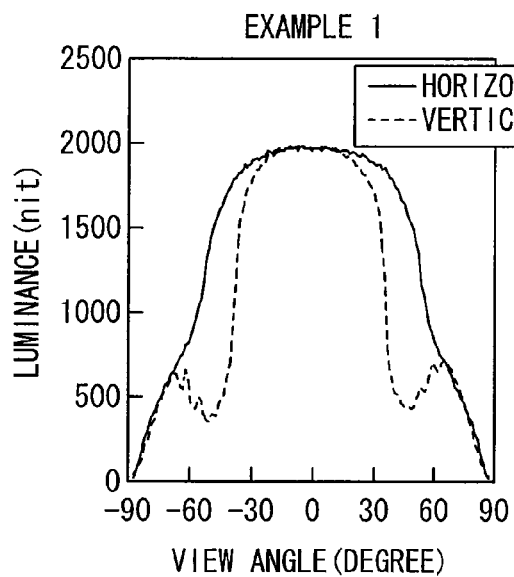
FIG. 19 Relational diagrams showing a relation between a view angle and luminance of the display units according to Example 1 and Comparative examples 1 to 3.
Figure 19:
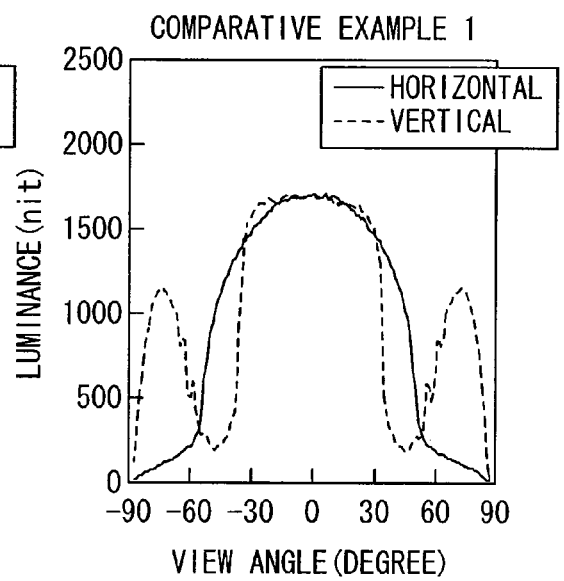
Figure 19:
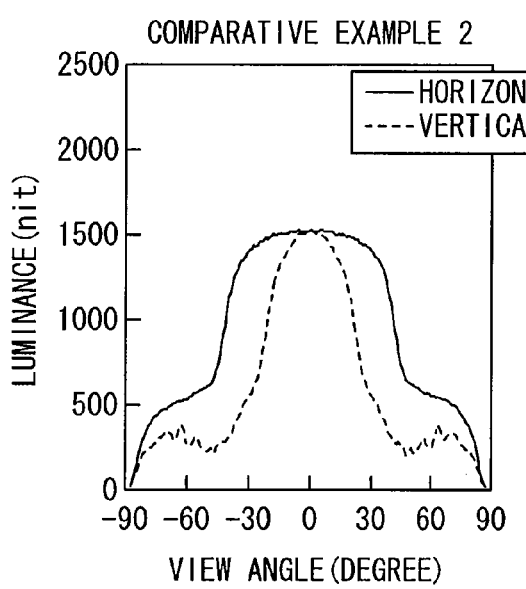
Figure 19:
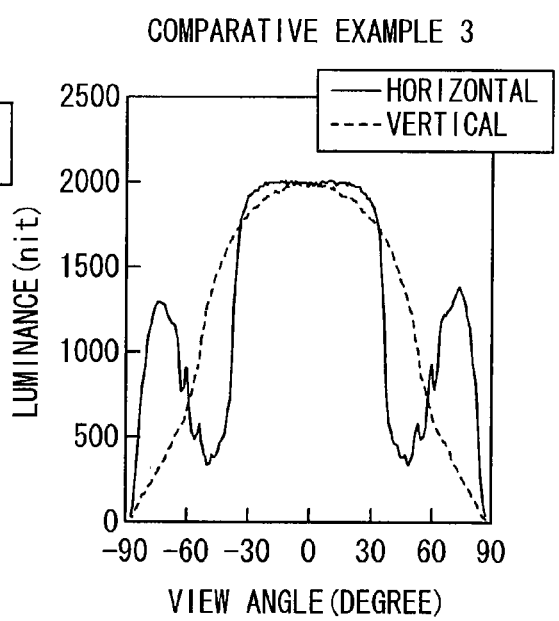

Subsequently, the front luminance, the illuminance; the alignment luminance, and the view angle of the display units according to Example 1 and Comparative examples 1 to 3 were respectively measured. Further, the color difference of the display units according to Example 1 and Comparative example 4 were measured. For example, in Example 1, as shown in FIG. 17, in the state that the diffusion sheet 32, the luminance enhancement film 33, the wave plate 34, and the first polarizer 20A were sequentially arranged from the light source 31 side on the light source 31 and the reflective sheet 35 was arranged behind the light source 31, the front luminance, the illuminance, the alignment luminance, and the view angle of light emitted from the first polarizer 20A were measured by using a luminance colorimeter (EZ-contrastXL88 manufactured by ELDIM Co.). In addition, in Example 1, the luminance enhancement film 33 was arranged so that the extending direction of the convex section 33a was in the horizontal direction (X axis direction). Further, in Comparative example 1, the structure was similar to that of Example 1, except that the luminance enhancement film 33 was replaced with the light transmissive film 133. Furthermore, in Comparative examples 2 and 3, the structure was similar to that of Example 1, except that the wave plate 34 was eliminated. In Comparative example 4, the structure was similar to that of Example 1, except that the wave plate 34 was eliminated, and vertical polarization obtained by rotating the first polarizer 20A by 90 degrees was adopted. Results of the front luminance, the illuminance, and the view angle are shown in FIG. 18. Results of the alignment luminance are shown in FIGS. 19(A) to 19(C). Further, the results of the color difference are shown in FIGS. 20(A) to 20(D). In addition, each u'v' in the vertical axis (Δu'v') in FIGS. 20(A) to 20(D) is the unit representing color, and corresponds to XY coordinates in the hue plane.

Based on FIG. 18 and FIGS. 19(A) to 19(C), it was found that in Example 1, the front luminance, the illuminance, and the horizontal view angle were larger than those of Comparative example 1. Meanwhile, it was found that in Comparative example 2 in which the wave plate 34 was not used, the front luminance, the illuminance, and the horizontal view angle were smaller than those of Comparative example 1. Further, it was found that in Comparative example 3 in which the wave plate 34 was not used and the luminance enhancement film 33 was arranged so that the extending direction of the convex section 33a was in the vertical direction, the horizontal view angle was narrower than that of Comparative example 1 though the front luminance and the illuminance were increased. Accordingly, it was found that by arranging the luminance enhancement film 33 so that the extending direction of the convex section 33a was in the horizontal direction by using the wave plate 34, the front face luminance, the illuminance, and the horizontal view angle was able to be increased.

Based on FIGS. 20(A) to 20(D), in the case where the wave plate 34 was used (Example 1), the color difference was equal to the color difference in the case not using the wave plate 34 (Comparative example 4). Accordingly, it was found that the wave plate 34 did not adversely affect the color difference.

Second Example

Next, a description will be given of Examples 2 and 3 of the display unit 2 according to the foregoing second embodiment in contrast with Comparative examples 5 and 6. In Comparative examples 5 and 6, the wave plate 36 was not used.

(Front Luminance, Illuminance, Alignment Luminance, and View Angle)

Figure 21:
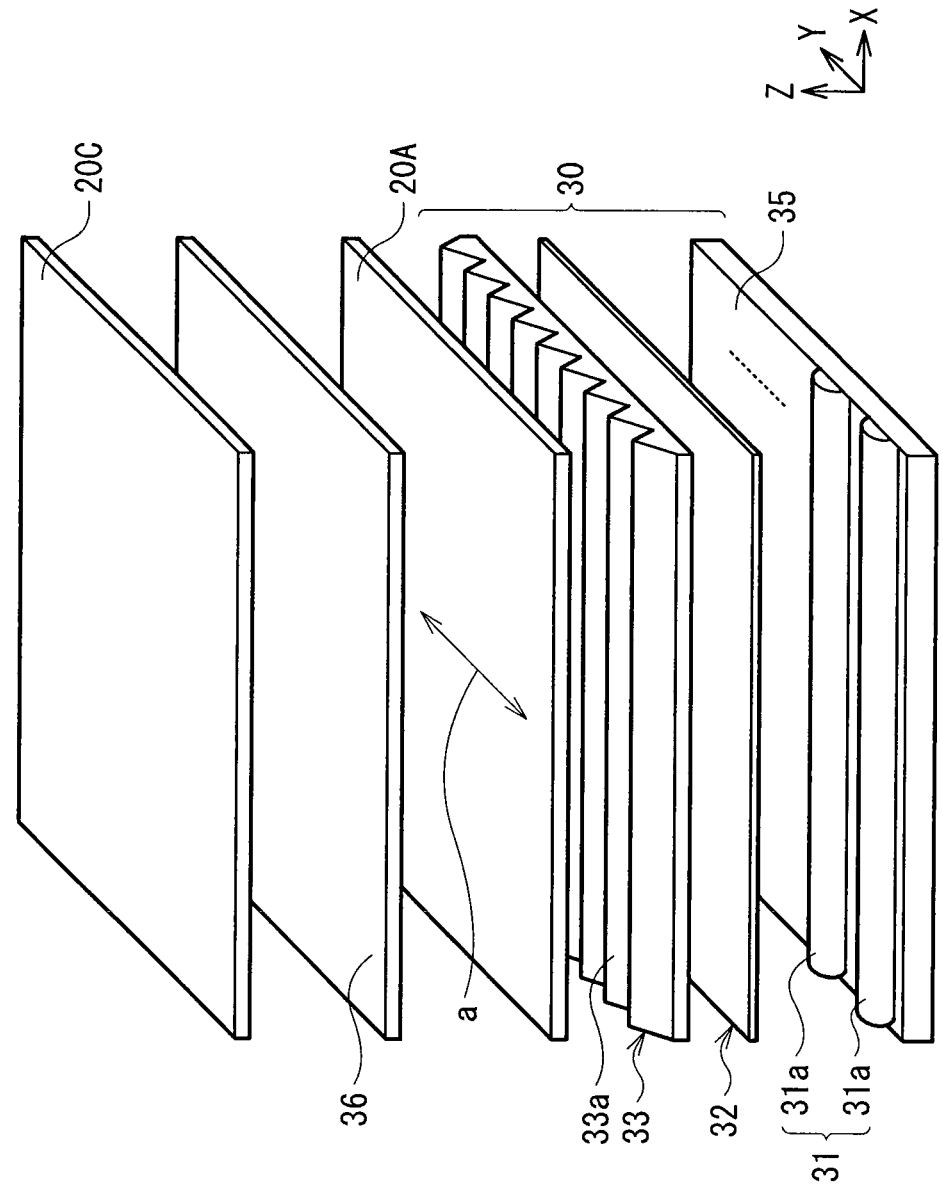
FIG. 21 A perspective view showing an example of a developed configuration of a display unit according to Example 2.
Figure 23A:
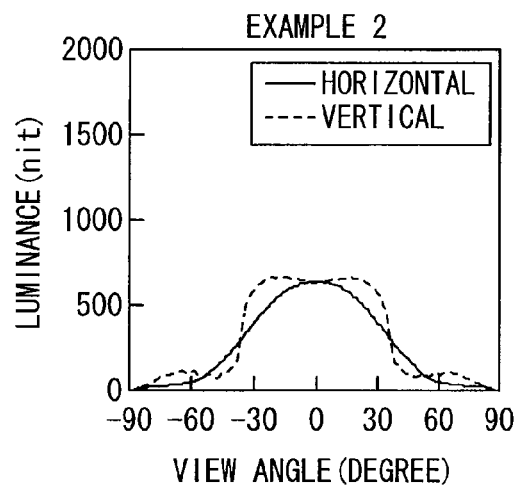
FIG. 23 Relational diagrams showing a relation between a view angle and luminance of the display units according to Examples 2 and 3 and Comparative examples 5 and 6.
Figure 23B:
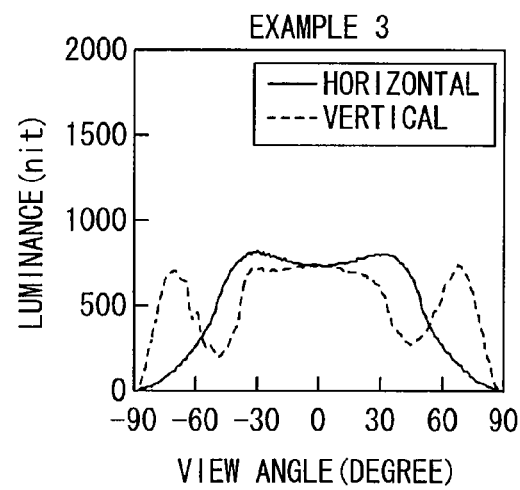
Figure 23C:
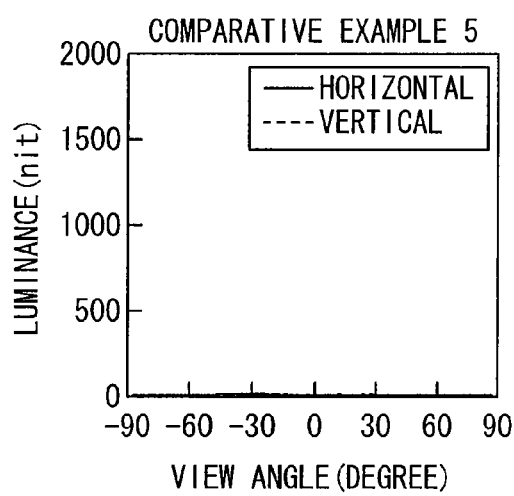
Figure 23D:
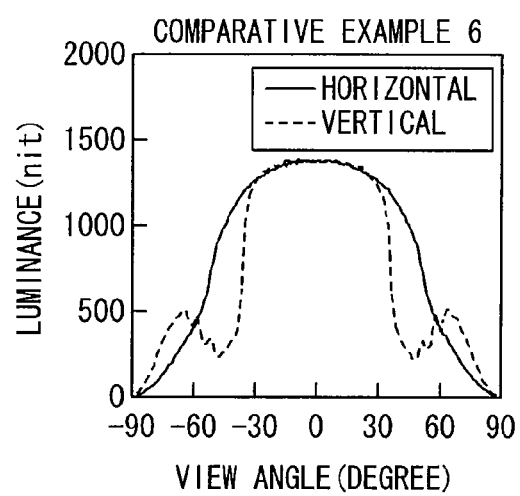
Figure 24:
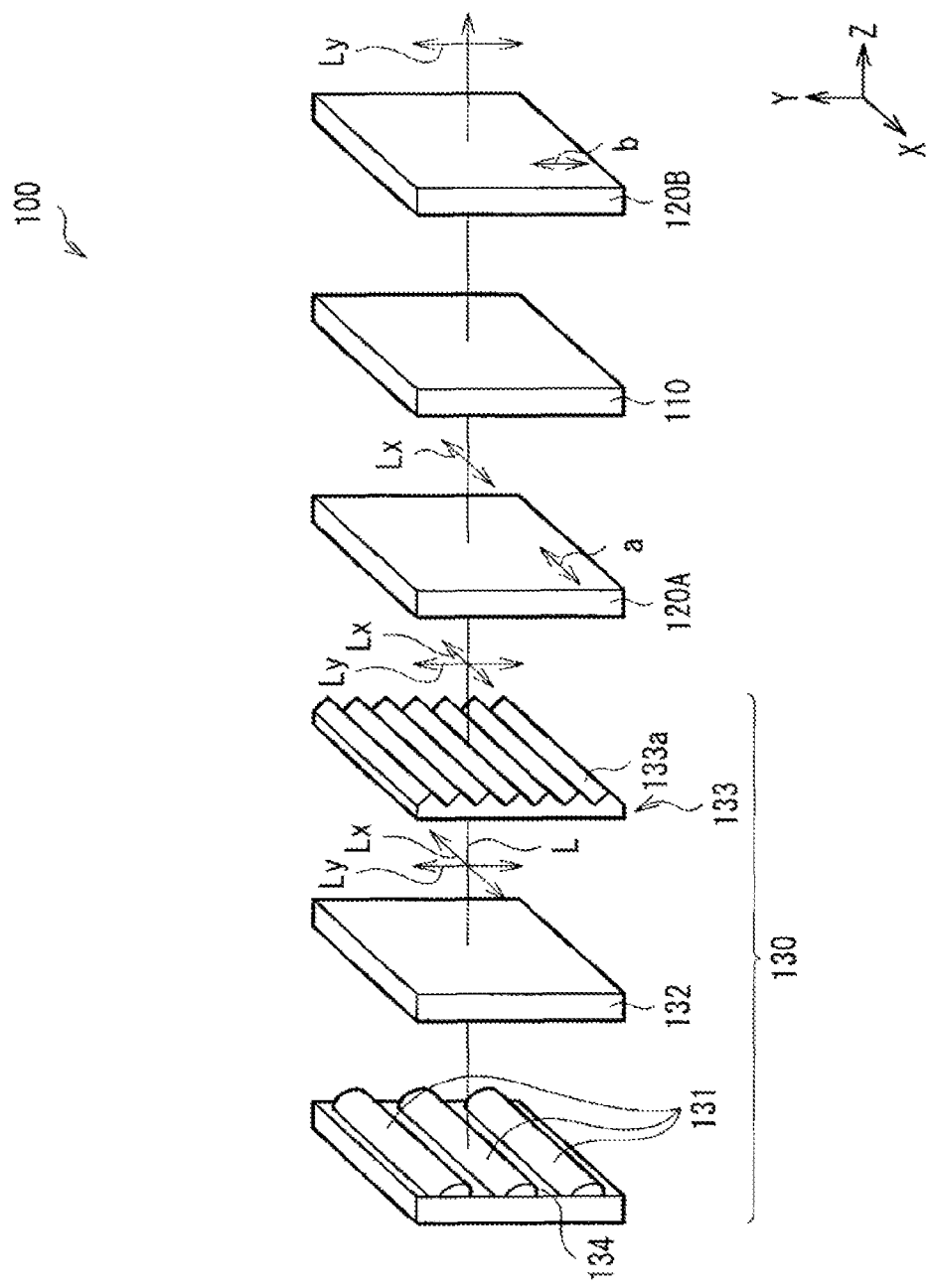
FIG. 24 A perspective view showing an example of a developed configuration of a conventional display unit.
Figure 25:
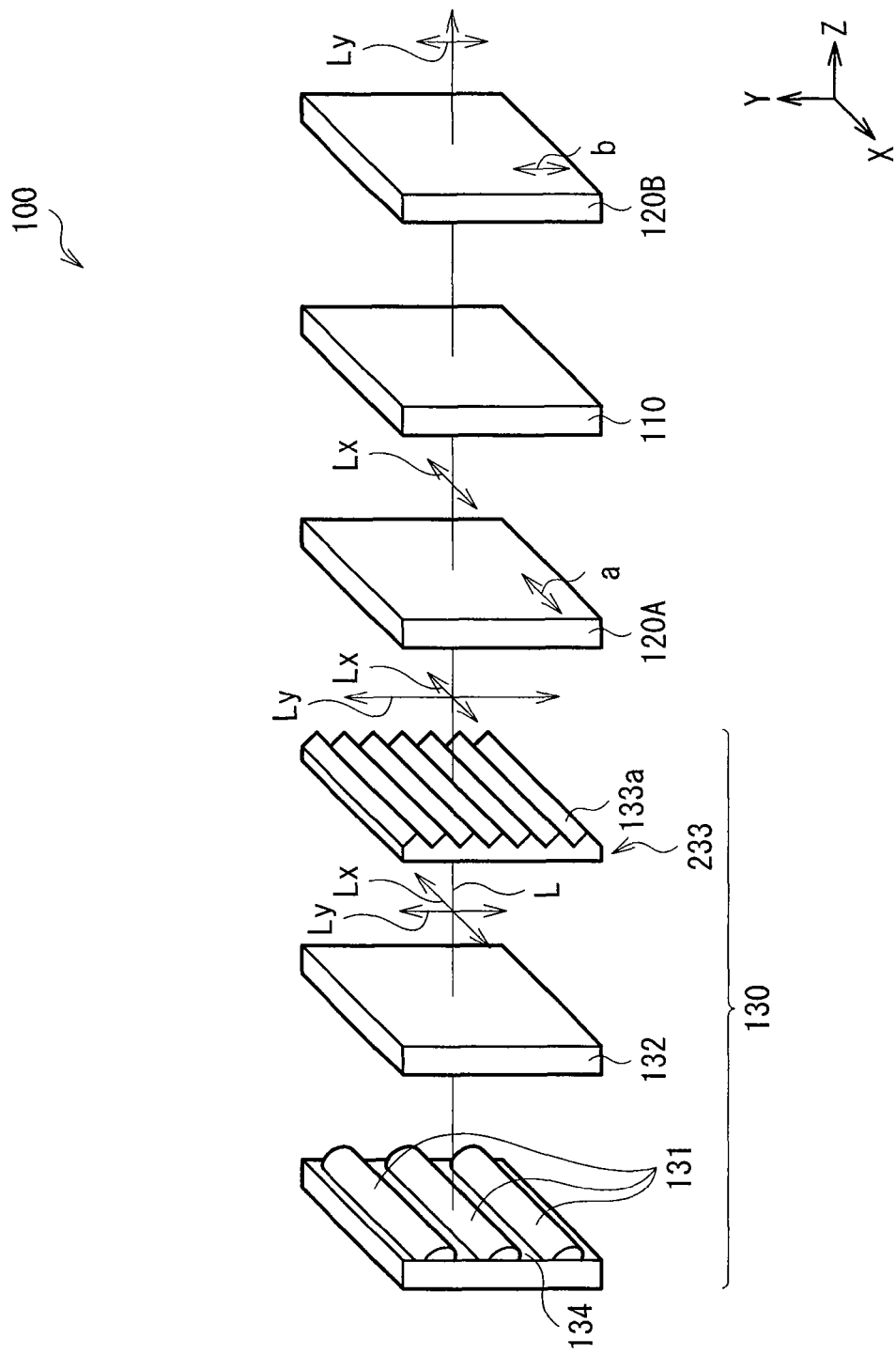
FIG. 25 A perspective view showing a developed configuration of a display unit according to a reference example.
Figure 26:
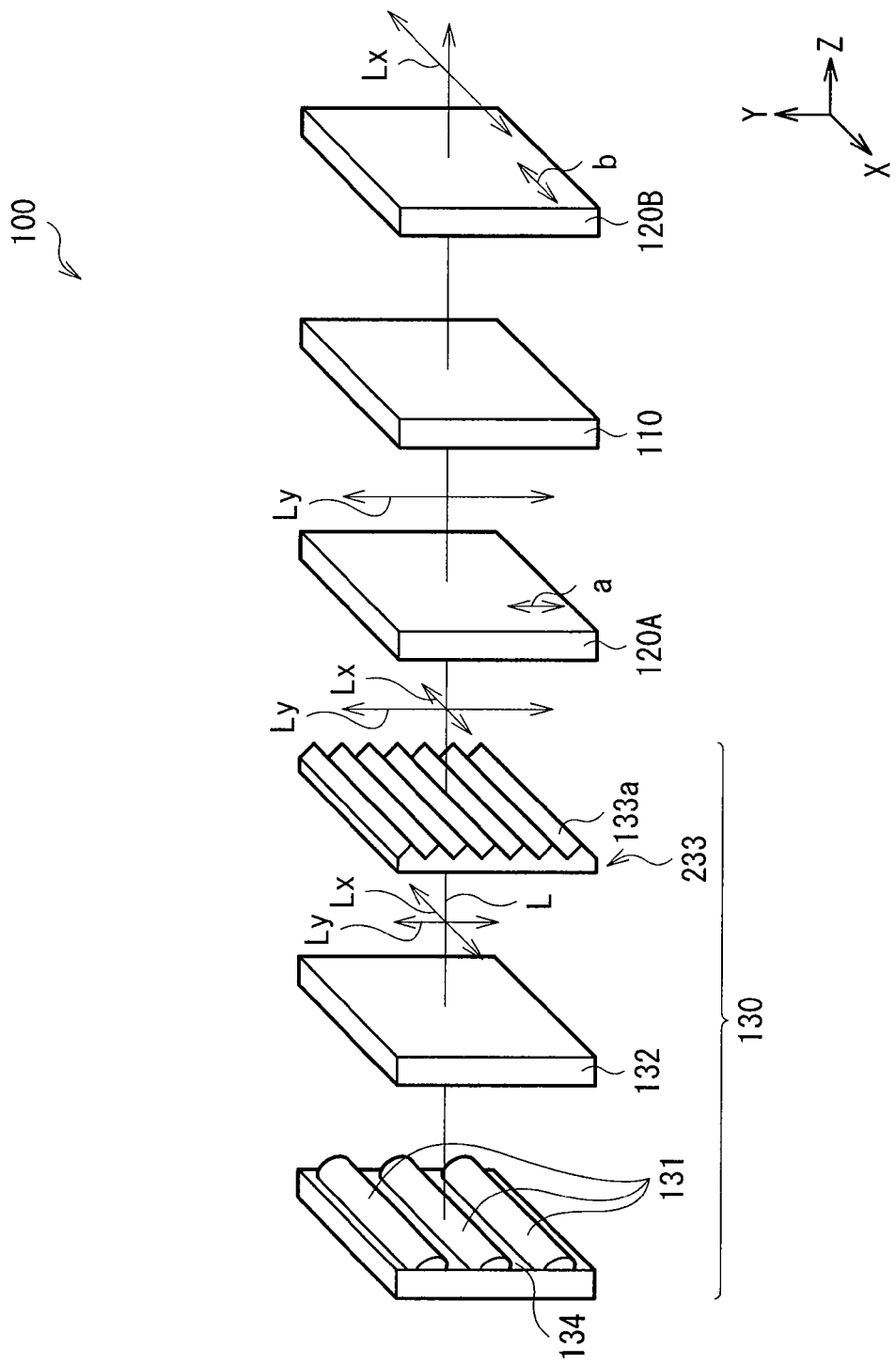
FIG. 26 A perspective view showing a developed configuration of a display unit according to another reference example.
Figure 27:
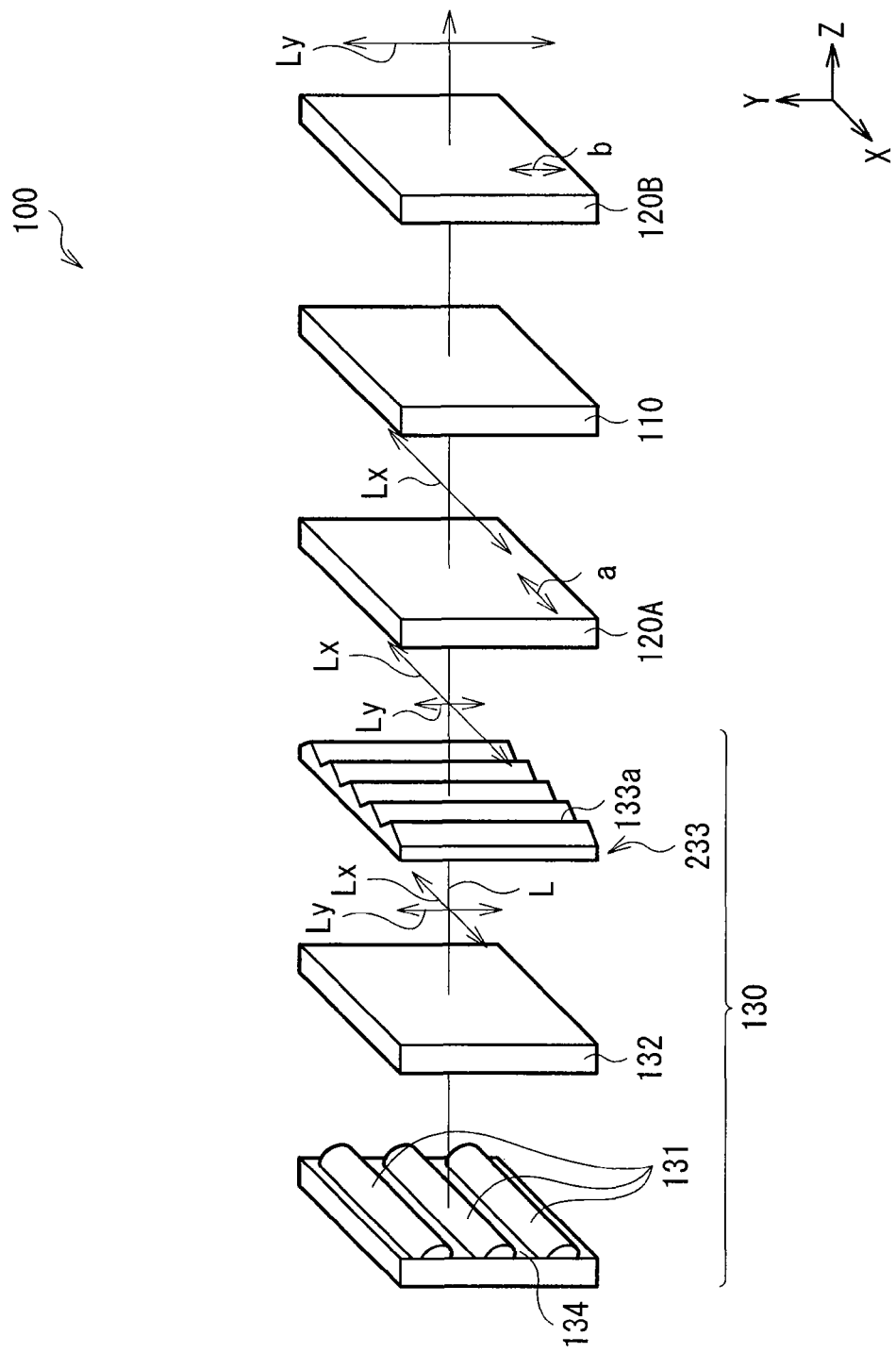
FIG. 27 A perspective view showing a developed configuration of a display unit according to still another reference example.

In this case, the front luminance, the illuminance, the alignment luminance, and the view angle of display units according to Examples 2 and 3 and Comparative examples 5 and 6 were respectively measured. For example, as shown in FIG. 21, in the state that the diffusion sheet 32, the luminance enhancement film 33, the first polarizer 20A, the wave plate 36, and a third polarizer 20C were sequentially arranged from the light source 31 side on the light source 31 and the reflective sheet 35 was arranged behind the light source 31, the front luminance, the illuminance, the alignment luminance, and the view angle of light emitted from the third polarizer 20C were measured by using a luminance colorimeter (EZ-contrastXL88 manufactured by ELDIM Co.). The third polarizer 20C was used as a polarized sunglass, and had a polarizing axis like the first polarizer 20A. In Example 2 and Comparative example 5, the polarizing axis of the third polarizer 20C was in the horizontal direction. In Example 3 and Comparative example 6, the polarizing axis of the third polarizer 20C was in the vertical direction. Results of the front luminance, the illuminance, and the view angle are shown in FIG. 22. Results of the alignment luminance are shown in FIGS. 23(A) to 23(D).

Based on FIG. 22 and FIGS. 23(A) to 23(D), in Examples 2 and 3, a certain luminance was able to be observed whether the polarizing axis b of the second polarizer 20B as a polarized sunglass was horizontal or vertical. Meanwhile, in Comparative examples 5 and 6 not using the wave plate 36, the luminance was able to be measured in the case where the polarizing axis b of the second polarizer 20B as a polarized sunglass was vertical, but the luminance was not able to be measured in the case where the polarizing axis b of the second polarizer 20B was horizontal. Accordingly, it was found that in the case where the wave plate 36 was used, there is no case where the liquid crystal screen was not able to be viewed with the use of the polarized sunglass. On the contrary, it was found that in the case where the wave plate 36 was not used, there was a case where the liquid crystal screen was not able to be viewed with the use of the polarized sunglass.

While the embodiments have been described with reference to the examples, the embodiments are not so limited, and various modified examples may be made.

For example, in the foregoing embodiments and the like, one sheet of the luminance enhancement film 33 is used. However, two sheets of the luminance enhancement film 33 may be stacked and used. In this case, it is desirable that arrangement is made so that the extending direction of the convex section 33a of the upper sheet is orthogonal to that of the lower sheet. It is also desirable that one luminance enhancement film 33 has the higher refractive index of the luminance enhancement film 33 in the extending direction of the convex section 33a, and the other luminance enhancement film 33 has the higher refractive index of the luminance enhancement film 33 in the arrangement direction of the convex section 33a.

In the foregoing embodiments and the like, the configuration of the liquid crystal display has been specifically described. However, it is not necessary to provide all layers. In addition, other layers may be provided.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A display unit comprising:
a display panel driven based on an image signal;
a pair of a first polarizer and a second polarizer sandwiching the display panel;
a reflection sheet;
a light source illuminating the display panel provided between the reflection sheet and the display panel;
a diffusion sheet provided between the light source and the display panel;
a single layer light transmissive film provided between the first polarizer and the diffusion sheet; and
a wave plate provided between the first polarizer and the single layer light transmissive film,
wherein the diffusion sheet passes non-polarized light from the light source to the single layer light transmissive film, passes reflected light from the single layer light transmissive film to the reflection sheet, and passes non-polarized light from the reflection sheet to the single layer light transmissive film,
the single layer light transmissive film has a plurality of first convex sections along one plane,
the respective first convex sections extend toward the horizontal direction, and are arranged in a direction crossing the extending direction of the first convex sections,
a refractive index in one direction of the respective first convex sections is larger than a refractive index in a direction orthogonal to the one direction of the respective first convex sections,
the wave plate changes a polarization direction of light entering the wave plate, so that among light passing through the single layer light transmissive film orthogonal to the one direction which then enters the wave plate, an angle between a polarization direction of the light after the light passes through the wave plate and a polarizing axis direction of the first polarizer becomes small, and
the second polarizer has a polarizing axis transmitting a polarization component in the vertical direction.

2. The display unit according to claim 1, wherein the respective first convex sections have shape anisotropy in which the respective first convex sections extend in the horizontal direction and are arranged in the vertical direction.

3. The display unit according to claim 1, wherein the respective first convex sections are in the shape of a prism.

4. The display unit according to claim 1, wherein the respective first convex sections have refractive index anisotropy in which a refractive index in the horizontal direction is larger than a refractive index in a direction orthogonal to the horizontal direction.

5. The display unit according to claim 1, wherein the wave plate changes the polarization direction of the light entering the wave plate, so that among light passing through the single layer light transmissive film orthogonal to the one direction which then enters the wave plate, the angle between the polarization direction of the light after the light passes through the wave plate and the polarizing axis direction of the first polarizer is 0 degrees.

6. The display unit according to claim 1,
wherein the wave plate is a ½ wavelength plate, and
an angle between the direction orthogonal to the one direction of the single layer light transmissive film and the polarizing axis direction of the first polarizer is 90 degrees.

7. The display unit according to claim 6,
wherein the ½ wavelength plate has refractive index anisotropy, and
an angle made by an axis direction of the refractive index anisotropy of the ½ wavelength plate and the direction orthogonal to the one direction of the single layer light transmissive film is 45 degrees.

8. The display unit according to claim 1, wherein the second polarizer has the polarizing axis in the vertical direction.

9. The display unit according to claim 1,
wherein the respective first convex sections are provided along the one plane on the first polarizer side,
the single layer light transmissive film has a plurality of second convex sections in a plane on the light source side,
the plurality of second convex sections extend toward the horizontal direction, are arranged in parallel in an extending direction thereof, and are arranged in parallel in a direction crossing the extending direction, and
a refractive index in the one direction of the respective second convex sections is larger than a refractive index in a direction orthogonal to the one direction of the respective second convex sections.

10. A display unit comprising:
a display panel driven based on an image signal;
a pair of a first polarizer and a second polarizer sandwiching the display panel;
a reflection sheet;
a light source illuminating the display panel provided between the reflection sheet and the display panel;
a diffusion sheet provided between the light source and the display panel;
a single layer light transmissive film provided between the first polarizer and the diffusion sheet; and
a wave plate provided on a side of the display panel facing the second polarizer,
wherein the diffusion sheet passes non-polarized light from the light source to the single layer light transmissive film, passes reflected light from the single layer light transmissive film to the reflection sheet, and passes non-polarized light from the reflection sheet to the single layer light transmissive film,
the single layer light transmissive film has a plurality of convex sections along one plane,
the respective convex sections extend toward the horizontal direction, and are arranged in a direction crossing the extending direction of the first convex sections,
a refractive index in one direction of the respective convex sections is larger than a refractive index in a direction orthogonal to the one direction of the respective convex sections,
the first polarizer has a polarizing axis transmitting a polarization component in the direction orthogonal to the one direction,
the second polarizer has a polarizing axis transmitting light that has passed through the display panel, and the wave plate changes a polarization state of light passing through the second polarizer to a state other than horizontal polarized light.

11. The display unit according to claim 10, wherein the respective convex sections have shape anisotropy in which the respective convex sections extend in the horizontal direction and are arranged in the vertical direction.

12. The display unit according to claim 10, wherein the respective convex sections are in the shape of a prism.

13. The display unit according to claim 10, wherein the respective convex sections have refractive index anisotropy in which a refractive index in the horizontal direction is larger than a refractive index in a direction orthogonal to the horizontal direction.

14. The display unit according to claim 10, wherein the wave plate changes the light passing through the second polarizer into circular polarized light or elliptically-polarized light.

15. The display unit according to claim 10, wherein the wave plate changes the light passing through the second polarizer into non-linear polarized light.

16. The display unit according to claim 10, wherein the wave plate is a ¼ wavelength plate or a ½ wavelength plate.

17. The display unit according to claim 10, wherein the wave plate is a biaxial stretched film.

18. The display unit according to claim 10, wherein the wave plate has a glare-proof film scattering outside light on a surface of the wave plate facing the second polarizer.

19. The display unit according to claim 10, wherein the wave plate has an antireflection film having a low reflectance of outside light on a surface of the wave plate facing the second polarizer.

20. The display unit according to claim 10, wherein the first polarizer has the polarizing axis in the direction orthogonal to the one direction.

21. The display unit according to claim 10, wherein the second polarizer has the polarizing axis in the horizontal direction.

22. The display unit according to claim 1, wherein the single layer light transmissive film is made of a resin material having translucency.

23. The display unit according to claim 1, wherein the single layer light transmissive film is made of a resin material having positive birefringence.

24. The display unit according to claim 1, wherein the reflective sheet reflects non-polarized light.

25. The display unit according to claim 1, wherein the reflective sheet is made of a foamed PET.

* * * * *